(12) United States Patent
Pezzutti

(10) Patent No.: US 7,496,652 B2
(45) Date of Patent: Feb. 24, 2009

(54) INTELLIGENT NETWORK PROVIDING NETWORK ACCESS SERVICES (INP-NAS)

(75) Inventor: David Pezzutti, Golden, CO (US)

(73) Assignee: TeleServices Solutions, Inc., Golden, CO (US)

(*) Notice: Subject to any disclaimer, the term of this patent is extended or adjusted under 35 U.S.C. 154(b) by 440 days.

(21) Appl. No.: 10/883,261

(22) Filed: Jul. 1, 2004

(65) Prior Publication Data
US 2004/0249927 A1 Dec. 9, 2004

Related U.S. Application Data

(63) Continuation-in-part of application No. 09/905,787, filed on Jul. 13, 2001, now Pat. No. 6,760,762.

(60) Provisional application No. 60/218,596, filed on Jul. 17, 2000.

(51) Int. Cl.
*G06F 15/173* (2006.01)

(52) U.S. Cl. ............... 709/223; 709/217; 709/219; 705/1

(58) Field of Classification Search ............... 709/223, 709/201, 217, 219; 705/1
See application file for complete search history.

(56) References Cited

U.S. PATENT DOCUMENTS

| | | | |
|---|---|---|---|
| 4,719,617 A | 1/1988 | Yanosy, Jr. et al. | |
| 5,444,693 A | 8/1995 | Arslan et al. | 370/221 |
| 5,703,930 A | 12/1997 | Miska et al. | |
| 5,726,979 A | 3/1998 | Henderson et al. | 370/254 |
| 5,737,319 A | 4/1998 | Croslin et al. | 370/255 |
| 5,812,533 A | 9/1998 | Cox et al. | 370/259 |
| 5,848,143 A | 12/1998 | Andrews et al. | |
| 5,901,284 A | 5/1999 | Hamdy-Swink | 713/200 |
| 5,910,984 A | 6/1999 | Low | 379/279 |
| 5,953,389 A | 9/1999 | Pruett et al. | 379/9 |
| 5,970,120 A | 10/1999 | Kasrai | 379/9 |
| 5,995,830 A | 11/1999 | Amin et al. | |
| 6,009,103 A | 12/1999 | Woundy | 370/401 |

(Continued)

FOREIGN PATENT DOCUMENTS

WO    WO 99/67719    * 12/1999

OTHER PUBLICATIONS

Atoui, M., "Virtual Private Network Call Processing in the Intelligent Network," International Conference on Communications, p. 561-565, (1992).

(Continued)

*Primary Examiner*—Frantz B Jean
(74) *Attorney, Agent, or Firm*—Hensley Kim & Holzer, LLC

(57) ABSTRACT

An open Information Services network architecture is disclosed which enables multiple business entities to assume specialized roles of access provider, service provider, and service retailer. The disclosed technology provides instant plug-and-play service, decouples access and service networks and provides seamless (single step) access enabling customers to maintain a service account regardless of location. The benefits of the disclosed technology, among others, include: Multi-level and multi-service registration; Broker Services providing customers with a choice of provider; Security Services relating to distribution; Revenue Assurance services, Gentle Reminder/Gentle Touch; Revenue Assurance services pertaining to usage integrity verification upon registration; mobile services derived from G-ISN; and claim benefits pertaining to LNP services derived from G-ISN.

34 Claims, 15 Drawing Sheets

U.S. PATENT DOCUMENTS

| | | | | |
|---|---|---|---|---|
| 6,032,040 | A | 2/2000 | Choy et al. | |
| 6,058,103 | A | 5/2000 | Henderson et al. | 370/254 |
| 6,088,328 | A | 7/2000 | McKnight | 370/216 |
| 6,088,587 | A | 7/2000 | Abbadessa | 455/424 |
| 6,178,438 | B1 | 1/2001 | Tschirhart et al. | 709/200 |
| 6,181,695 | B1 | 1/2001 | Curry et al. | 370/356 |
| 6,185,519 | B1 | 2/2001 | Lin et al. | 703/21 |
| 6,188,757 | B1 | 2/2001 | Malik | 379/207 |
| 6,208,642 | B1 | 3/2001 | Balachandran et al. | 370/385 |
| 6,215,867 | B1 | 4/2001 | Eslambolchi | 379/229 |
| 6,226,273 | B1 | 5/2001 | Busuioc et al. | 370/270 |
| 6,229,819 | B1 | 5/2001 | Darland et al. | 370/467 |
| 6,233,446 | B1 | 5/2001 | Do | |
| 6,260,067 | B1 | 7/2001 | Barnhouse et al. | |
| 6,286,047 | B1 | 9/2001 | Ramanathan et al. | 709/224 |
| 6,363,411 | B1 | 2/2002 | Dugan et al. | |
| 6,421,438 | B1 | 7/2002 | Denton et al. | |
| 6,445,918 | B1 | 9/2002 | Hellander | |
| 6,560,326 | B1 | 5/2003 | Clark | |
| 6,603,970 | B1 | 8/2003 | Huelamo Platas et al. | |
| 6,606,744 | B1 * | 8/2003 | Mikurak | 717/174 |
| 6,633,638 | B1 | 10/2003 | De Trana et al. | 379/242 |
| 6,789,111 | B1 | 9/2004 | Brockway et al. | |
| 6,799,216 | B2 | 9/2004 | Steegmans | |
| 6,850,983 | B2 | 2/2005 | Rezaiifar et al. | |
| 6,934,530 | B2 | 8/2005 | Engelhart | |
| 6,940,847 | B1 | 9/2005 | Glitho et al. | |
| 6,961,681 | B1 | 11/2005 | Choquier et al. | |
| 6,964,050 | B1 | 11/2005 | Do | |
| 7,107,054 | B2 | 9/2006 | Florkey et al. | |
| 7,130,619 | B2 | 10/2006 | Florkey et al. | |
| 7,130,807 | B1 * | 10/2006 | Mikurak | 705/7 |
| 7,130,901 | B2 | 10/2006 | Roach | |
| 7,146,418 | B2 | 12/2006 | Bahl | |
| 2004/0133793 | A1 * | 7/2004 | Ginter et al. | 713/193 |

OTHER PUBLICATIONS

Batten, A., "Personal Communications Services and the Intelligent Network," British Telecommunications Engineering, (Aug. 1990).

Computational Modelling Concepts, Jan. 1995. TINA-C. Overall Concepts and Principles of TINA, Feb. 1995.

Garrahan, J.J., et al., "Intelligent Network Overview," IEEE Communications Magazine, p. 30-36, (Mar. 1993).

Handley et al., "SDP: Session Description Protocol", Internet Engineering Task Force, Mar. 2, 1999 (pp. 1-31), retrieved from http://ietfreport.isoc.org/old-ids//draft-ietf-mm.

Handley, "SIP: Session Initiation Protocol", Network Working Group, RFC 2543, Mar. 1999 (pp. 1-153). cited by other.

Homa, J., et al., "Intelligent Network Requirements for Personal Communications Services," IEEE Communications Magazine, p. 70-76, (Feb. 1992).

Jordan, D.S., "Bell Operating Company Intelligent Voice Networks and Services," Bell Communications Research, Proceedings of the National Communications Forum, vol. XXXIX, Oct.

Miller, P., "Intelligent Network/2: A flexible framework for exchange services," Bell Communications Research Exchange, vol. 3 (No. 3), (May/Jun. 1987).

Object Management Group, Inc. The Common Object Request Broker: Architecture and Specification. Document No. 91.12.1, Revision 1.1, ISBN 0-471-58792-3.

Object Management Group, Inc. The Common Object Request Broker: Architecture and Specification. Revision 2.0, Jul. 1995. Randy Otte, Paul Patrick, and Mark Roy.

Russo, E.G., et al., "Intelligent Network Platforms in the U.S.," AT&T Technical Journal, p. 26-43, (1991).

Stefani, J.: "Open distributed processing: an architectural basis for information networks" Computer Communications, NL, Elsevier Science Publishers BV, Amsterdam, vol. 18, N.

Understanding Corba—The Common Request Broker Architecture. Prentice Hall PTR, 1996. TINA-C.

Vakil et al., "Supporting Service Mobility with SIP", Internet Engineering Task Force, Dec. 2000, (pp. 1-10) <draft-itsumo-sip-mobility-service-00.txt. cited by other.

Yeh, S.Y., et al., "The Evolving Intelligent Network Architecture," IEEE Conference on Computer and Communication Systems, p. 835-839, (1990).

Wikipedia, "IP Multimedia Subsystem", http://en.wikipedia.org/wiki/IP__Multimedia__Subsystem.

Wikipedia, "Next Generation Networking", http://en.wikipedia.org/wiki/Next__Generation__Networking.

Wikipedia, "Telecoms & Internet converged Services & Protocols for Advanced Networks (TISPAN)", http://en.wikipedia.org/wiki/TISPAN.

* cited by examiner

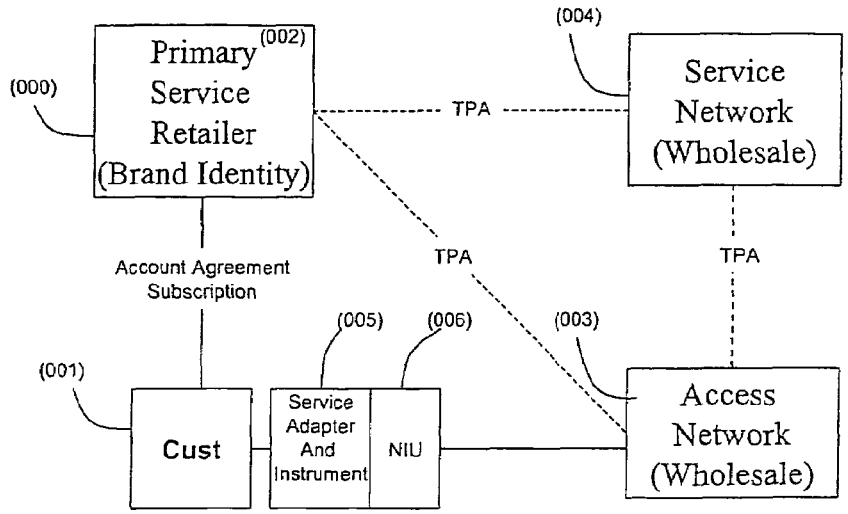
Figure A1: Global Information Service Network
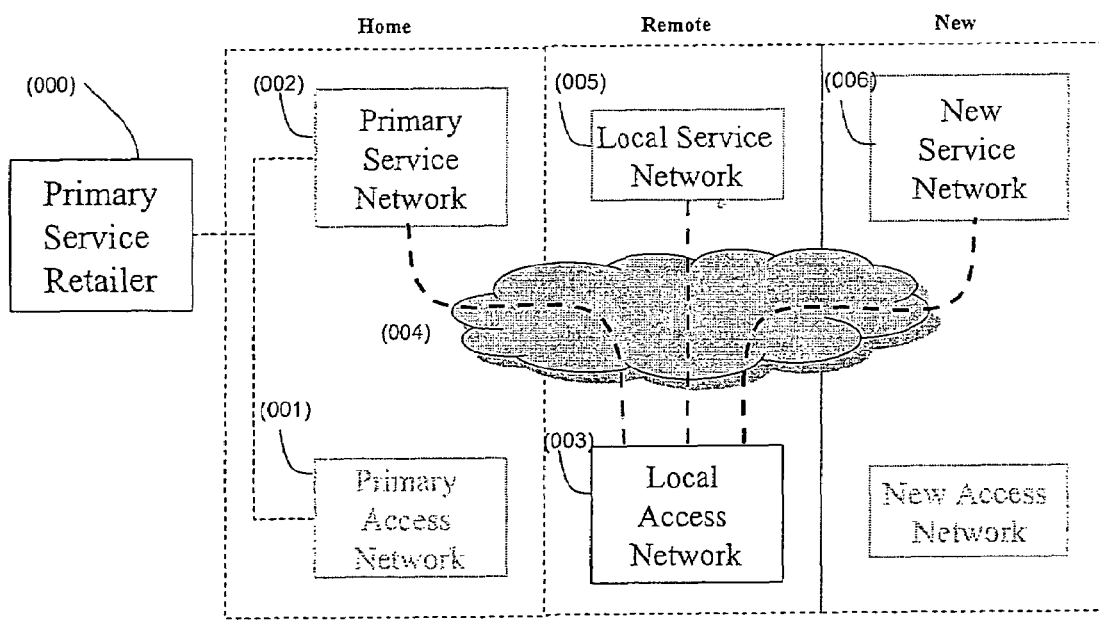
Figure A2: INAP G-ISN Arrangements

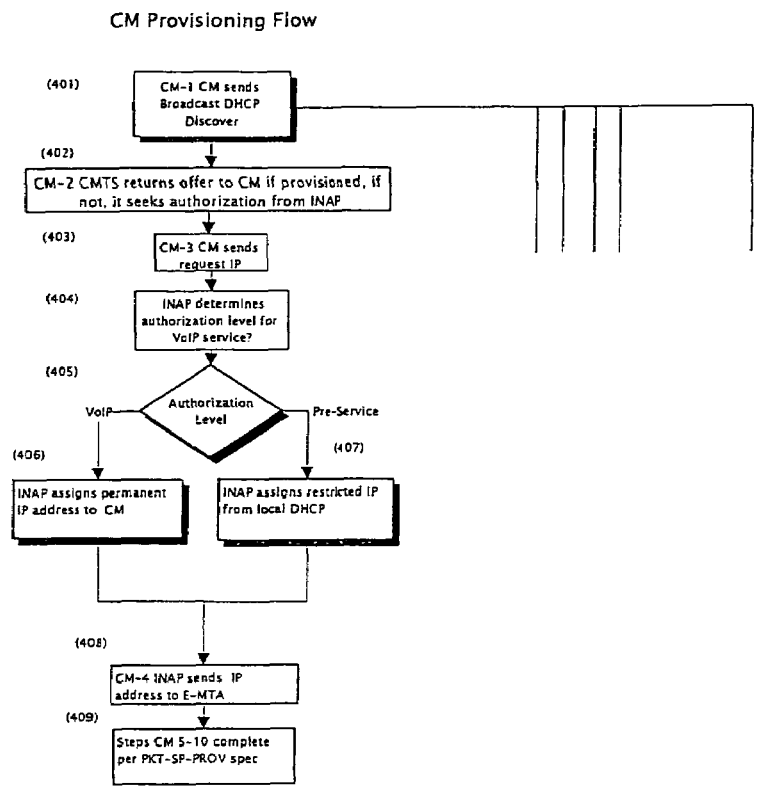
Fig A3: CM Provisioning under INAP
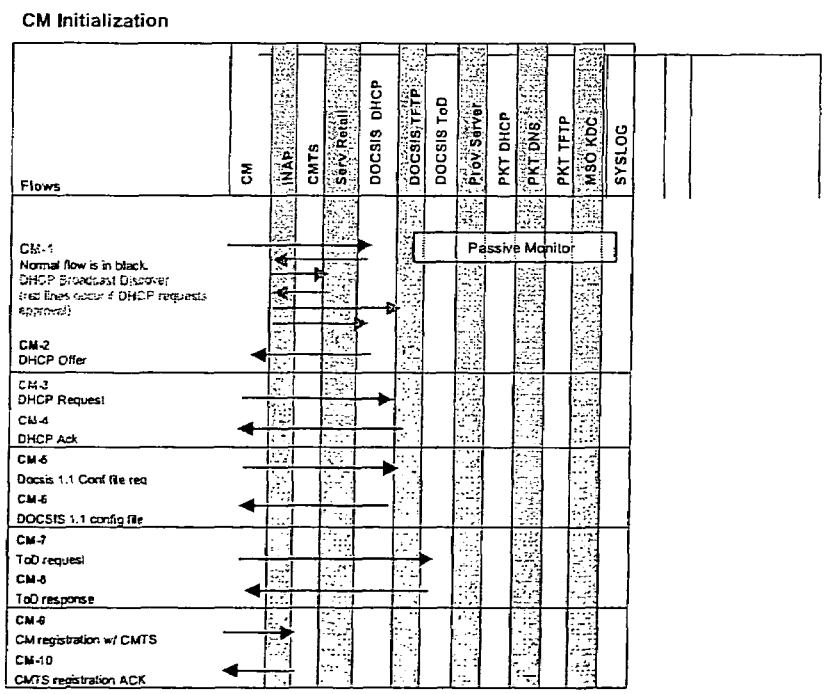
Fig A4: CM Provisioning Flow

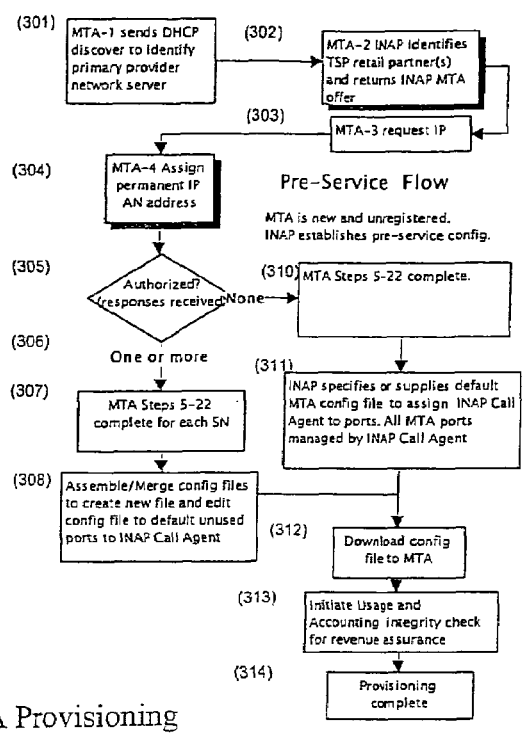
Fig A5: MTA Provisioning
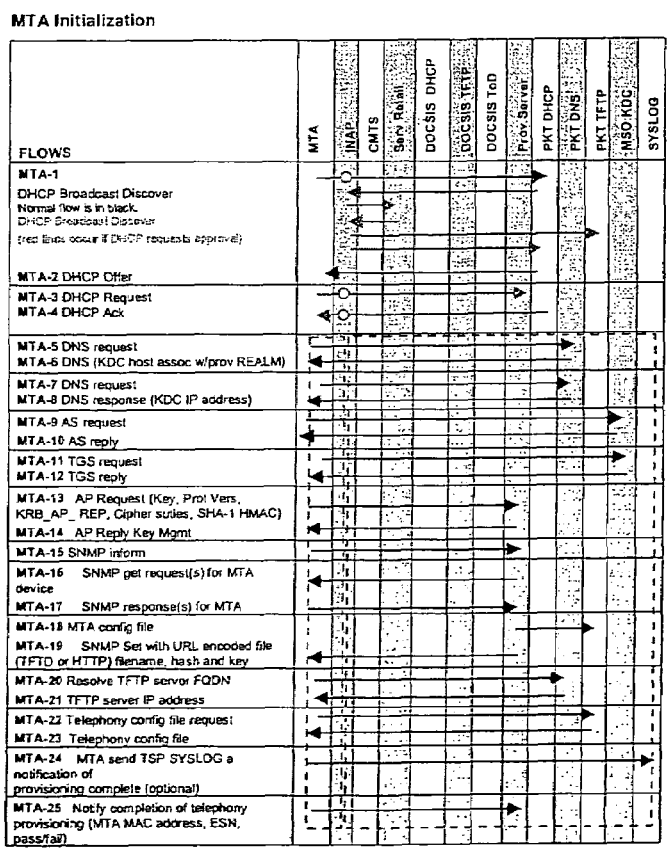
Fig A6: MTA Provisioning Flow

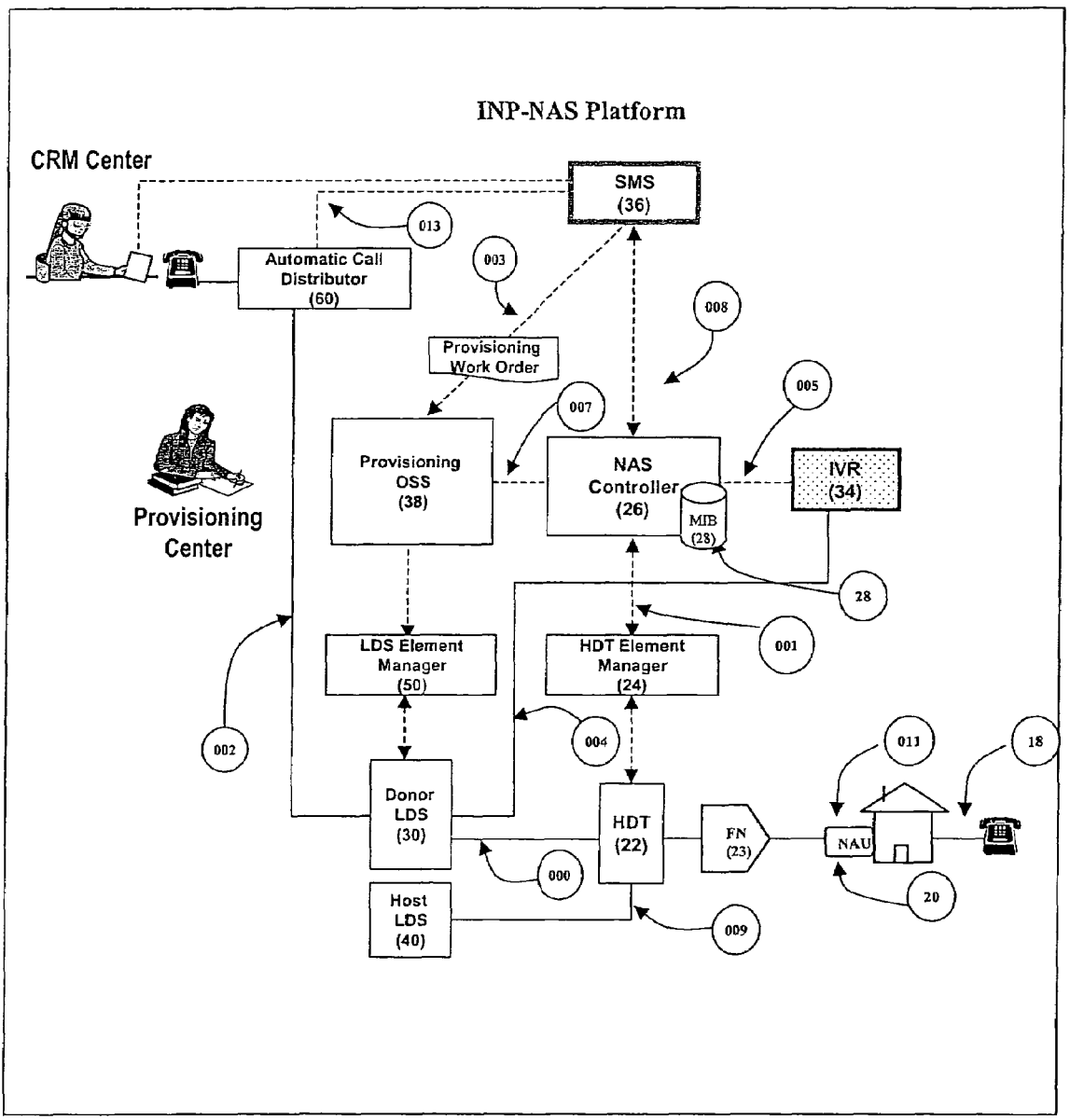
Figure 1 INP Network Access Services Platform Architecture

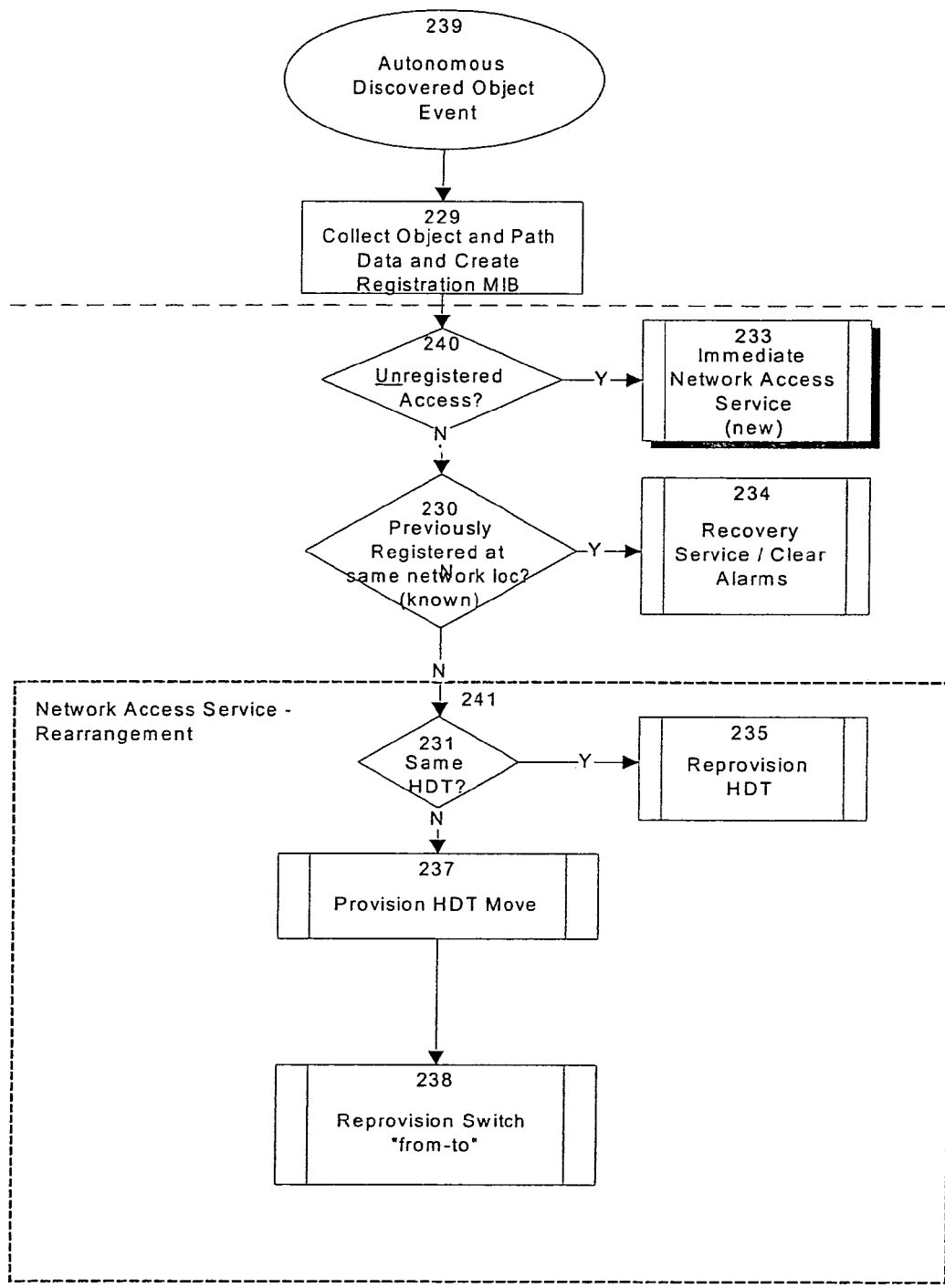
Figure 2 Top Level NAS Control Flow

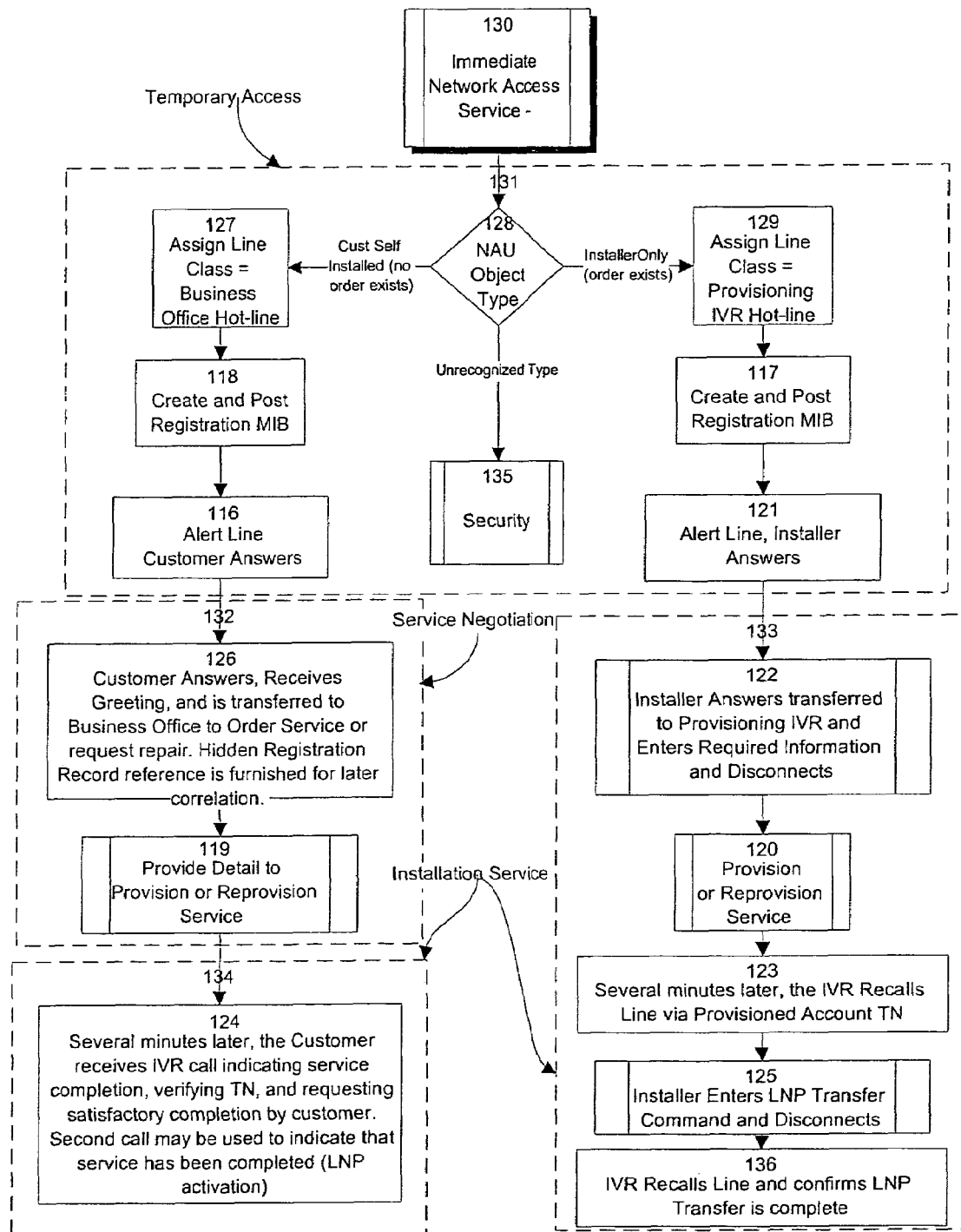
Figure 3 Immediate Network Access Service

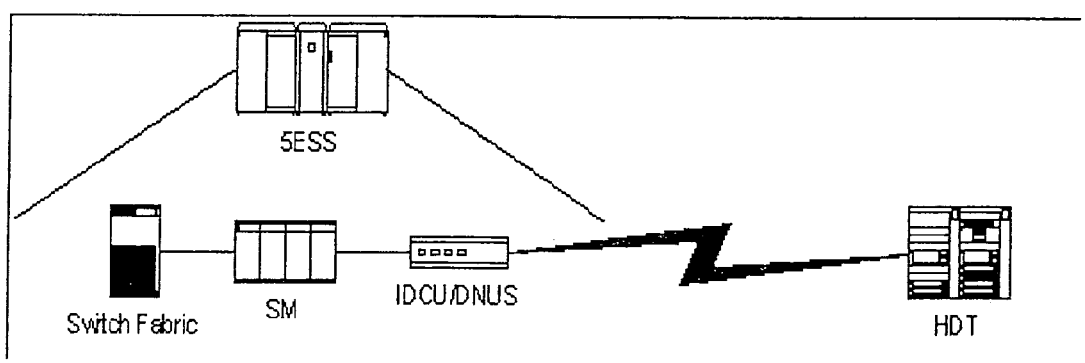
Figure 4 – Nomenclature of the Switch (LDS)

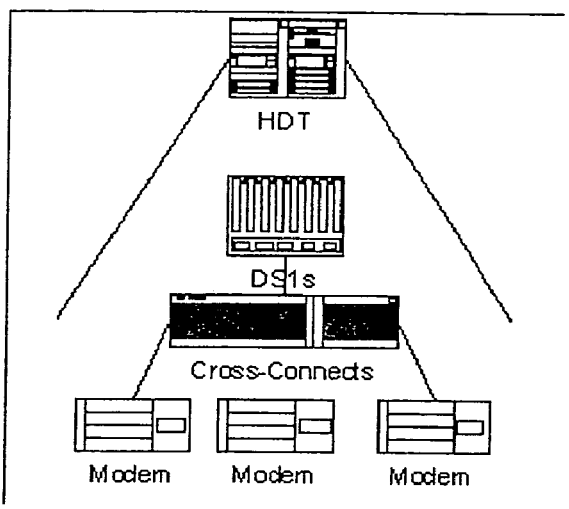
Figure 5 – Nomenclature of the Host Data Terminal (HDT)

Figure 6 – Generic Example of a Subscriber Order

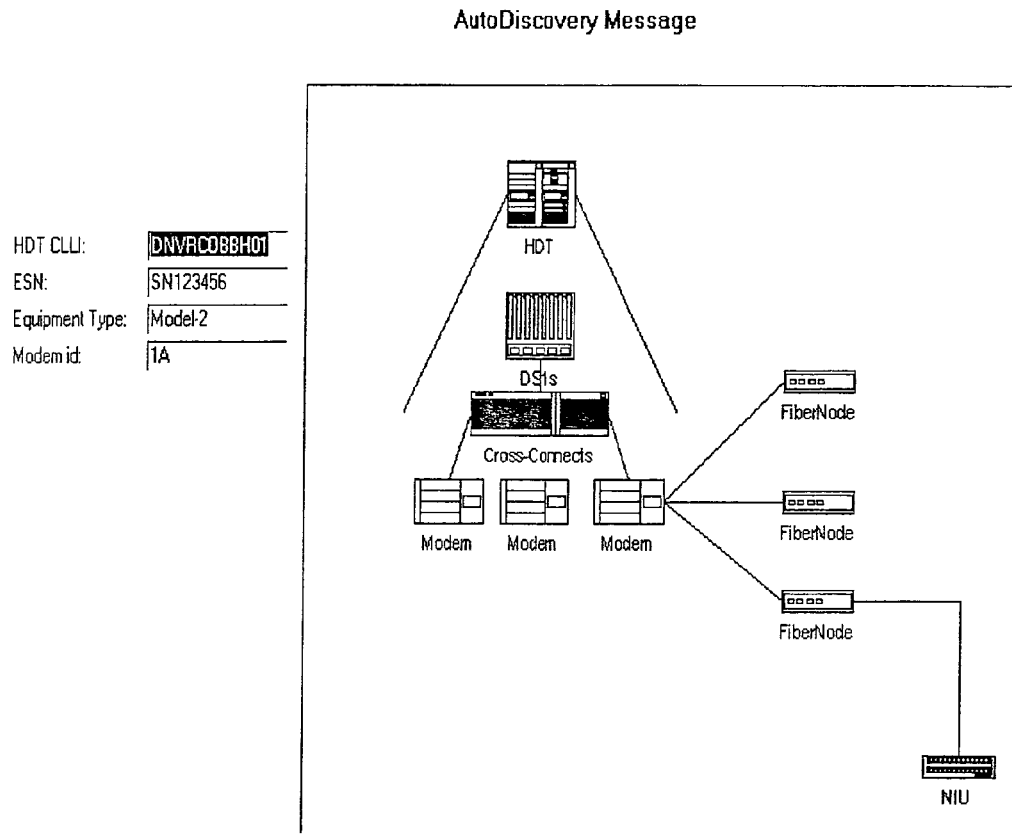
Figure 7 – Object Discovery message arriving from HDT upon the event that an NAU was powered up on the CATV network.

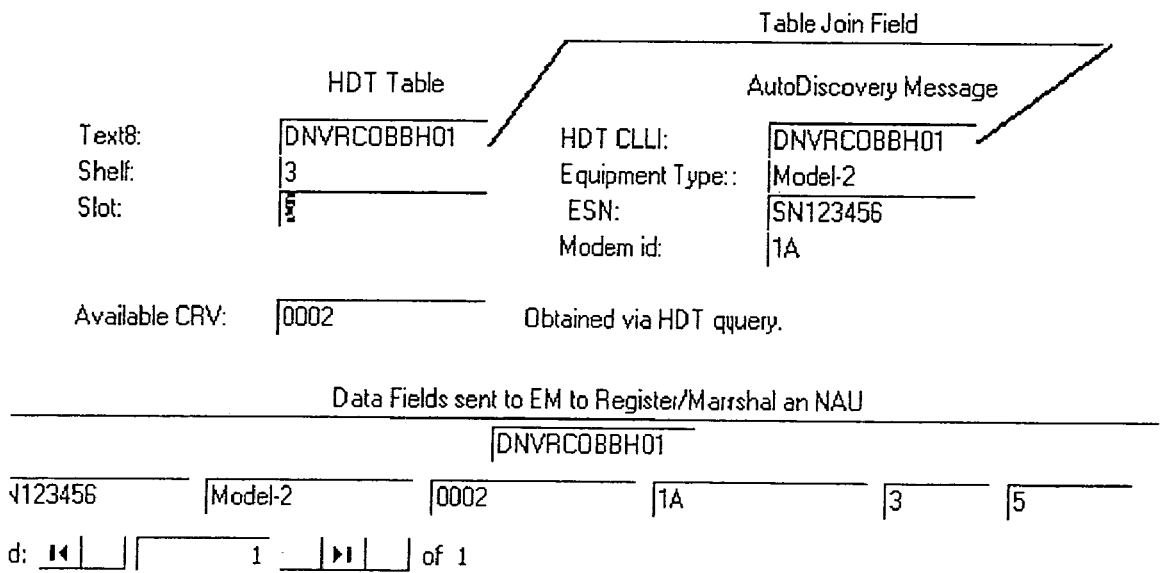
Figure 8 – Matching the Object Discovery Message to the static HDT information.

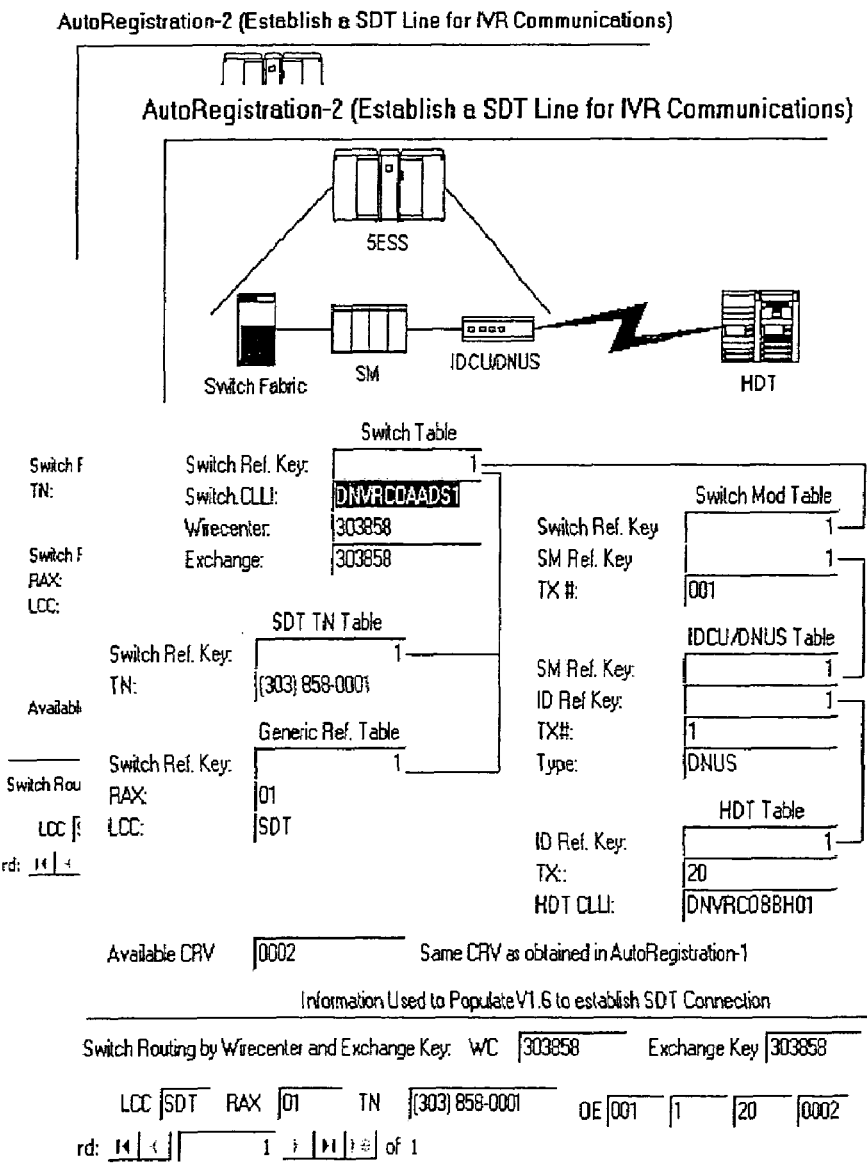
Figure 9 – Establishing an in-band communication path to enter IVR information.

IVR Message
W/O Number     [123456]
Master TN      [(303) 858-3158]
Port           [1]
Note: Master TN and Port are not needed for single line orders being provisioned on port 1.
ord: |◄| | | 1 |►|►|| |►*| of 1
Figure 10 – The installer provides IVR information.

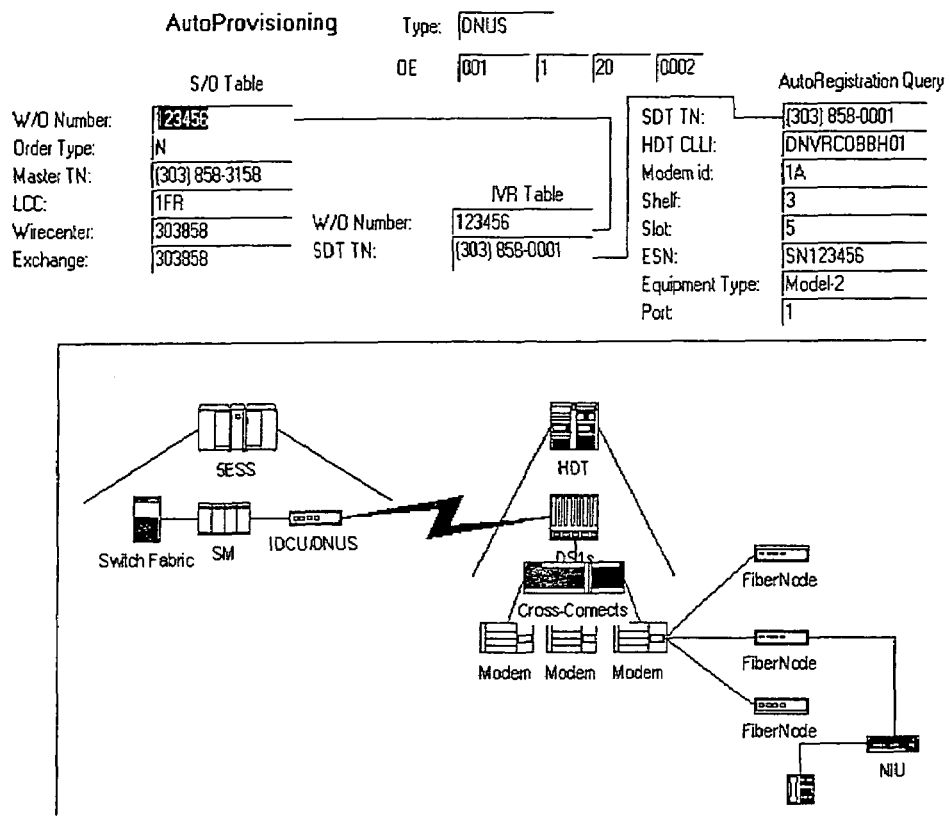
Figure 11 – The information used to establish to in-band communications channel is now correlated to the original Work Order that was entered.

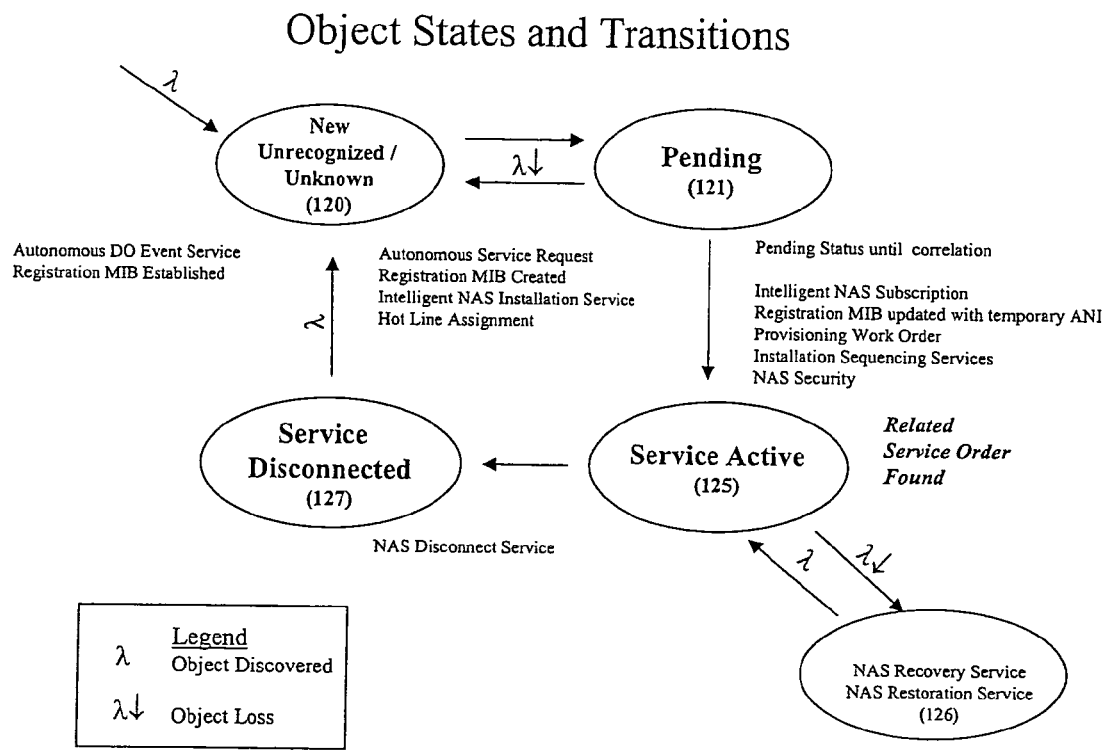
Figure 12 – Events and Services Relationship to Object State Diagram

INTELLIGENT NETWORK PROVIDING NETWORK ACCESS SERVICES (INP-NAS)

The application claims the benefits of U.S. Provisional Application No. 60/218,596, filed Jul. 17, 2000, and is a continuation-in-part of U.S. Non-provisional application Ser. No. 09/905,787, filed Jul. 13, 2001, U.S. Pat. No. 6,760,762, which will issue Jul. 6, 2004.

FIELD OF THE INVENTION

The present invention relates generally to communication and information networking and more particularly to intelligent networks which provide network access services for the benefit of network providers, service providers and customers.

NOMENCLATURE

| ACRONYM or TERM | DEFINITION |
|---|---|
| Advanced PHY | Advanced Physical later relate to improvements made to Docsis 1.0 |
| AIN | Advanced Intelligence Network |
| ANI | Automatic Number Identification |
| AN | Access Network is any facilities based access network such as cable, wireline, powerline, fiberline, radio, satellite, etc. |
| APCO ® | Association of Public Safety Communications Officials International |
| A-SN | Application Service Network |
| ASP | Application Service Provider hosts specialty applications |
| Binding | Term used for the permanent assignment of one element or party to another. When one element is assigned to transmit to a specific internet protocol address of a second element, the two interfaces are logically bound. |
| Broker | Selection process offering one provider or service from among a set of alternatives, and may be predetermined, assigned, or criteria or list based. For example, Trading Partners having an interconnect agreement may be brokered. |
| CATV | Community Antenna Television |
| C&IS | Communications and Information Service |
| Caller ID | Another form on ANI, It is the telephone number of the caller |
| CATV | Community Antenna TeleVision |
| CLEC | Competitive Local Exchange Carrier |
| Clone | A clone is a device that duplicates the identity of another device so that it appears to be the same device. (security breach) |
| CMIP | Comma Management Information Protocol |
| CMS | Cable Management System |
| CPE | Customer Premise Equipment |
| CRM | Customer Management Relationship is the collection of services provided to manage customer accounts |
| CRV | Call Reference Value |
| DHCP | Dynamic Host Configuration Protocol |
| DLEC | Data Local Exchange Carrier |
| DSL | Digital Services Line |
| DSP | Data Service Provider |
| Disconnect | The issuance of a service removal |
| Distinctive Ring TN | Distinctive Ring telephone number |
| DP | Detection Points |
| DNS | Domain Name System |
| DOCSIS | Data Over Cable Service Interface Specification |
| Donor Switch | Temporary Hot-Line local digital switch used to provide initial pre-service |

-continued

| ACRONYM or TERM | DEFINITION |
|---|---|
| E911 | Emerging Telephone Service |
| EMSID | Element Management System identification |
| ESN | Electronic Serial Number |
| FN | Fiber Node |
| Foreign Network | The access network of a non-primary provider |
| FSA | Fiber Service Area is the geographic service extent of an FN |
| Gateway | Barrier server that ensures all information exchanges occur in accordance with established ICA. Performs interconnect policy enforcement and service conversion. |
| G-ISN | Global Information Service Network |
| HDT | Host Digital Terminal |
| HDTID | HDT identification |
| HLR | Home location register contains subscriber profile database within primary service network |
| Home Network | The physical access network of a customer's primary provider |
| Host Switch | Designated service local digital switch for a customer in the primary network |
| Hot-line | Also known as a "warm", a "hot"," or "ring down" line transfers a caller to a specific number when the phone goes off-hook. It is service restricted. |
| HSD | High Speed Data |
| IA | Interconnect Agreement stipulate contractual obligations for service exchange such as service classes, billing, authorization limits, etc. |
| ICA | Inter-Connect Agreements |
| ID | Identification |
| IDLC | Integrated Digital Loop Carrier |
| INAP | Instant Access Service |
| INAS | Immediate Network Access Service provides on-demand service activation |
| IETF | Internet Engineering Task Force |
| IDCU/DNUS | Integrated Digital Control Unit Digital Network Unit for Sonet |
| ILEC | One Local Exchange Carrier |
| INP-NAS | Intelligent Network Providing Network Access Services |
| IP | Internet protocol |
| I-P | Intelligent Peripheral |
| ISDN | Integrated Services Digital Network |
| ISN | Internet Service Network |
| ISN | Information Service Network |
| IS | Distributed Information Service |
| ISP | Information Service Provider |
| IVR | Integrated Voice Response |
| Line | Term used for a physical circuit connecting customer phone to central office. A network access unit-port produces the equivalent to the line. Lines may have multiple telephone number assignments distinguished in some manner, such as distinctive ring patterns. |
| LDS | Local Digital Switch |
| LCC | Line Class Code establishes a short form of assignment of a service class to a line |
| LEN | Line Equipment Number |
| LNP | Local Number Portability where a subscriber maintains their prior telephone number regardless of physical location |
| MAC address | Media Access Control is contained within the Data layer of the open system interconnect model. |
| Master TN | Main line at a service locations |
| MIB | Management Information Base stores data relevant to a managed object. |
| MSC | Mobile services Switching Center |
| MSO | Multimedia Service Operator |
| MTA | Multimedia Terminal Adaptor |
| Multi-hosting | The association of one network element with more than one other network element. It is a form of growth in which service areas attributable to an element are overlapped. |
| NAS | Network Access Services |
| NAU | Network Access Unit |

-continued

| ACRONYM or TERM | DEFINITION |
|---|---|
| NMAS | Network Management and Activation System is a term referring to the collection of provisioning operations support system, plus servers that participate in the assignment of network resources. These include the Dynamic Host Configuration Protocol, Domain Name System, Trivial File Transfer Protocol, Time of Day, and other servers used to configure service. |
| NPAC | Number Portability Administration Center |
| NSP | Network Service Provider |
| OE | Office Electronics |
| OSI | Open System Interconnect |
| OSS | Operations Support System |
| P- | Signifies Primary followed by function. E.g. P-SR means primary provider or server |
| PBX | Private Branch Exchange communications server |
| PIC | Point in Calls |
| PIM | Personal Information Manager |
| POTS | Plain Old Telephone Service |
| PSAP | Public Safety Answering Point |
| PSDN | Public Service Data Network |
| PSTN | Public Service Telephony Network |
| SR | The primary provider with which a customer maintains an account. |
| Primary TN | Main line at a service locations |
| PVC | Permanent Virtual Circuit is a guaranteed persistent path established or disconnected by service order. |
| PVN | Private Virtual Network is a closed user community which receives specified services. Typically of a corporate environment which has replaced a PBX with a virtual PBX service running on a shared communications network. |
| RAX | Rate Exchange Area |
| REQ-REG | Autonomous Registration Request Message |
| QoS | Quality of Service |
| SAG | Street and Address Guide |
| SCP | Service Control Point |
| SDT | Soft Dialtone line treatment whereby a phone can only dial 911 or a business office. |
| SMS | Service Management System |
| SN | Service Network provides information services such as telephony, information services (internet), applications, or data services. |
| S-N | Service Negotiation |
| SIP | Session Initialization Protocol is the Internet Engineering Task Force standard for establishing session layer service to an intelligent end point device. |
| SMS | Service Management |
| SNMP | Single Network Management Protocol |
| Soft Disconnect | The assignment of an SDT LCC to a line. |
| Split NAU | This technique causes an NAU object to be assigned to more than one service address. It is capital efficient. |
| SR | Service Retailer |
| SS7 | Signaling System 7 network for routing and control |
| SSP | Service Switching Point |
| SVC | Switched Virtual Circuit is a path established or disconnected by a controlling end point using an address. |
| Switch | LDS provides services. May be a normal or "soft" switch providing LDS |
| TA | Terminal Adapter |
| TCP | Transaction Control Point as in TCP/IP Protocol |
| TDP | Trigger Detectional Point |
| TFTP | Trivial File Transfer Protocol |
| ToD | Time of Day |
| TPA | Trading Partner Agreements |
| TN | Telephone Number |
| TSN | Temporary Serial Number is used until the correct ESN can be obtained. |
| T-SN | Telephony Service Network |
| TSP | Telephony Service Provider |
| VLR | Visiting location register is the subscriber database used in a non-primary host cellular services network |
| VPN | Virtual Private Network |
| V-SN | Video Service Network |
| VoIP | Voice over Internet Protocol |
| XDSL | X represents the family of DSL service lines such as Asynchronous, High speed, Video, etc. |

CHARACTERISTICS OF THE INVENTION

The Intelligent Network Providing Network Access Services (INP-NAS) disclosed herein implements services comprising distributed information service (IS) networks. For example, Global Information Service Network (G-ISN) enabling information commerce between functional entities identified as Customer, Service Retailer (SR), Service Network (SN) and Access Network (AN) are provided by the present invention. The G-ISN operates as a seamless integrated network and must contain at least one SR, AN and SN functional entity. The architecture, methods and processes are identified to effect information commerce between these entities. Business service entities are commonly referred to as Service Providers and perform one or more functional roles. These include a Phone Company, Local Exchange Carriers (ILEC, CLEC, DLEC), an Information Service Provider (ISP), a Multimedia Service Operator (MSO), a DSL Provider, etc. For purposes of clarity, the functional entity names will be utilized rather than the more ambiguous business entity names.

The SR is the single point of contact for the service and establishes the brand identity on the services offered. G-ISN services may be any class (information services, telephony services, data services, video services, specialized applications such as PVN which includes corporate networks, and specialty ASPs that may offer for process monitoring and control such as telemetering data for medical purposes, pipelines, energy usage, etc.)

The G-ISN disclosed ensures seamless and instant service establishment (plug and play) for any customer via any access point—for example a customer can access service via any AN that can authenticate identity via information exchange (NAU, TA, script, device ID, PIM card, cookie exchange, etc.). Simply stated, it is one object of this invention to instantly provide a customer transparent access to his/her/its SN.

Service Retailer (SR) role is to advertise, offer services, manage the customer account and establish the service offerings, perform customer servicing, billing, etc and perform assignments for the Global Information Service Network (G-ISN). The SR effectively utilizes facilities for the delivery of service from the two network types. The SR is responsible for establishing Trading Partner Agreements (TPA), authorizing service, assigning service network transmitting the service order to properly establish the account, and performing new functions in addition to those normally associated with traditional Inter-Connect Agreements (ICA).

Access Network role is to enable physical and data layer service from access points. It is responsible for device registration, authentication, managing service path for the G-ISN, and offering brokerage services, if a SR cannot be located.

Service Network role is to provide services based on subscription profile of the customer. It must authenticate identity, and authorize access binding the customer CPE via the AN to the SN. Service Networks provide specialty services as Telephony (TSP), Information Services (ISP), Data Services (DSP), Applications Services (ASP), etc. The present INP-NAS invention works with all classes of specialty SNs, as well as all types of ANs.

In contrast with the present invention, traditional service providers are vertically integrated and operate networks comprising all three functions. They provide services in a seamless manner. However, they lack flexibility and are established in a set relation as to access network and point. Changes require an order resulting in subsequent provisioning or customer self-registration establishes new location.

As the Trading Partner business relationships evolve, the SNs and ANs operate under TPAs to set the conditions for the exchange of services in an integrated manner. With the emergence of specialized SN's as Trading Partners, those that operate under a TPA, provide seamless service, but are committed to AN and access point. Those that do not operate under a TPA provide access independence, but require customers to first obtain high speed data service with access addressing, and require customers to log in to obtain remote registration and authorization. DHCP addressing normally will change the device address when a session is terminated or when a lease expires, potentially disrupting the service unless registration is performed each time.

There is need for a dynamically configurable G-ISN to serve needs of customers seeking new and highly specialized services such as Internet Service (I-SNs), Telephony SNs for circuit or VoIP Telephony service, Video SNs, and Applications (business VPNs), without having to separately establish accounts with all entities.

When a customer accesses an AN, and its identity is authenticated, the access network queries the SRs to obtain authorization to establish the G-ISN configuration. If no authorization occurs, then the AN treats the access as a new service request and offers the customer Service Brokerage permitting them to select the SR. Upon selection, INAP Instant Access service connects the customer to the SR business office to order service. Another useful feature is that a customer operating remotely with new NAU devices can select the customer's SR to request temporary authorization. (This eliminates the need for customers to carry dedicated equipment and specialized devices to access the customer's SN, as is the case today for VoIP offerings.)

Once authorized, the G-ISN is established and the customer CPE is connected to the SN. The customer may utilize services and upon completion, the SN and AN will transmit usage reports to the SR for aggregation and billing. The SN may do so upon each session, whereas the AN may do so for each registration and be service interval based.

The G-ISN registration process determines if the access point constitutes the registered service location for E911 and CALEA® purposes. If the customer is located in a foreign network and an emergency occurs, the caller must be routed to the mobile PSAP of the AN, rather than that of the Home AN. Upon each registration, the AN informs the SN of the mobile PSAP that is operational for customer's point of access. So, if the customer is mobile, the PSAP will first confirm location and identity of the caller before dispatch.

Based on Object and Path Discovery (reporting data and the state change of a network element), this invention automatically initiates services and management applications benefitting Network Providers, Service Providers, and customers. A service controller (NAS Application Controller) provides these applications and integrates them with management systems and provisioning systems to provide services described herein.

The invention applies to any type of addressable network arrangement for voice, data, image, and video networks with any type of access arrangement. It applies to primary dedicated networks and secondary dial-up networks such as Information Service or Data Networks. It supports point-to-point, point-to-multipoint, and bus architectures, wireline, powerline, wireless, fiberline, radio, and optical network technologies. It applies to communication technologies such as analog, and digital, circuit and packet utilizing protocols such as Internet Protocol.

Object Discovery, the technology enabler for this invention, provides data collection of the object and network path for use by the NAS Applications. Object Discovery reports significant events (state changes) such as; unit on-line or off-line, device reset, power interruption, network rearrangements and changes, installation and construction activities, and other things affecting the network connectivity and control of this object. A primary benefit of the Object Discovery is that it minimizes dependency on pre-collected data.

This invention provides ease of access and improves the quality of services to customers, and revenue generation and operations savings services for network providers and service providers. The Network Access Services are implemented as NAS Applications. The discovery event is used to initiate a set of applications that provide the following services:

Access to network and information implementing "services on demand." "Service on Demand" has been a goal in the communications and information service industry. The Immediate Network Access Service supports customer self-installation to produce an immediate activation of service without requiring a qualified technician to perform the installation. It also supports the technician installation process, automating the installation steps and thus significantly improving the efficiency and predictability of installation. Customers benefit by getting service when they want it, and Service Providers benefit through earlier revenue generation and reduced operations costs.

Service Brokerage: If no existing service provider is identified and cannot be located, invention provides an optional brokerage service for customer to select SR, resulting in establishment of intelligent routing to SR Business Office. Provisioning Interactive Voice Response (IVR) is used to offer brokerage service based on classification and identification of element types resulting in services appropriate to the element being serviced. Brokerage service utilizes customer and provider supplied information to identify alternative providers or services that customer may select. Providers may supply "terms and pricing" which data is subsequently used by customer in making a final decision. Criteria may include multiple aspects of service including but not limited to brand name, current SR, cost, quality, promotional offerings, and services.

Automatic arrangement of network elements into a service configuration.

Simplified access to the Business Office to negotiate new services and to activate services "on-demand."

Automated services for technician to reduce installation time frames.

Automated Testing and Verification services.

Interconnection for the integrated provision, billing, and maintenance of services. exchanged via interconnection are specified. (Interconnect Agreements (IA) establish contractual roles and responsibilities between the Trading Partners.)

Automatic mobility and Local Number Portability services between Trading Partner entities.

Brokerage Services provide service diversity as each line can be independently assigned to different SNs by the SR.

Service Assurance (such as; reprovision and recovery, filtering of alarms, and move services) resulting in improved customer satisfaction.

Automatic support for engineering network rearrangement of the network topology.

Supports Operations Support Systems (OSS) used to maintain, provision, or engineer networks and improves Customer Relationship Management (CRM) services.

Revenue Assurance Services enable verification of integrity of billing usage data and enable simplified account management and revenue collections.

Security Services appropriate to the intervention.

Proper handling of E911 and CALEA services when customer has special registration.

One novelty of this invention is in its use of Discovered Object events to initiate a set of services in a meaningful and beneficial manner. For example, "Service on Demand" uses the discovery of an unregistered network access unit (NAU) object in the Access Network to offer brokerage service to customer and route customer to the selected SR Business Office hot-line. (The term "hot-line" is synonymous with the telecommunication's reference to a "Ring Down" circuit. A hot-line causes an automatic transfer to a pre-established number such as the Business Office when the originator picks up the phone.) In this case, an object is a unique NAU port which is equivalent to a physical "line." Another example is that object registration is examined to obtain access authorization from the SR. Another example of a beneficial service can be offered if a discovery event of a registered NAU results from a service disruption. In this situation, it is appropriate to implement one or more "self-healing services" to automatically restore service. In traditional networks, the discovery of an unregistered object (a.k.a. unknown device) initiates network security services to block access, log an intrusion alarm event, and dispatch a technician to investigate the alarm and perhaps eliminate the intrusion.

This invention thus facilitates access, while the traditional method blocks access, reverse of the traditional paradigm. It enables potential customers to easily gain access to network services on demand, while intruders seeking to improperly access services, are fully discovered and become highly visible to the network provider; thus exposing their identity and location.

The benefits of the invention are briefly described:

Object discovery eliminates complexity and costs associated with inventory creation and data collection (required for inventory management for traditional networks). The class of access services initiated offers significant value.

Provides "Services on Demand" (using the INAS) enabling customer self-installation: Scheduled appointments for the installation of NAU equipment normally can be eliminated. Installation delays leading to customer dissatisfaction and loss of revenue for the provider are eliminated.

Establishes new service delivery distribution channels enabling a traveling sales person, retail distribution to customer, or a technician to provide on-demand services when required.

The "just in time" data sourcing method of this invention ensures accuracy of data. Since the network and element data is collected as a result of Object Discovery, the data are 100% accurate. (Causes of data inaccuracies stem from many sources and will be explained later.)

Inventory is allocated via a continuous process rather than the normal process where inventory is determined quarterly or annually, resulting in excess inventory in growth-oriented industries in order to meet next period needs. With this invention, each assignment results in an inventory order enabling more efficient utilization of capital-intensive resources. This field is referred to as Capacity Management.

Efficient utilization of network capital resources. For example, in traditional networks, Soft Dial Tone (SDT) service requires the permanent assignment of switch resources to lines that are non-revenue generating. While SDT services provide benefit by eliminating the need to rework the physical installation and to avoid dispatch to a previously serviced address, this inefficient utilization of network resources requires non-revenue generating telephone number accounts in the switch for each line given this type of service treatment. This is of concern to engineering and to Public Utility Commissions seeking to minimize costs for the consumer. INP-NAS INAS draws the SDT resource from a pool and returns the resource to the pool typically within one hour. The service requires resources only until activation of the permanent service. Some PUC jurisdictions have disallowed SDT as being anti-competitive not fostering competition, i.e. not free and open. The invention overcomes this regulatory objection by ensuring that customer may select any SP as provider using the broker service.

The use of "just in time" access method eliminates the need to pre-provision services. Pre-provisioning is needed in current networks because of data inaccuracies and the time-consuming nature of provisioning. Eliminating pre-provisioning has the benefit of reducing extra work on orders provisioned that are cancelled, supplemented, or changed before the due date. Normal pre-provisioning of a Local Number Portability (LNP) order requires that a 10-digit trigger be assigned to the telephone number (TN) account in the switch to redirect local calls to the correct final destination by referencing the SS7 network's LNP database(s) (since the original TN is still in service on another switch). After activation, the 10-digit trigger is removed so that the local switch calls complete locally without referencing the SS7 network. One benefit is that SS7 transaction charges for all calls requiring the extra LNP activation lookup are not required.

The invention results in automatic registration of equipment attached to the local access network. The registration results in classification and initiation of AN services. Authorization for access is sought first from the SR. After receiving authorization, multi-network registrations are automatically performed for retailer, access, and service networks and multi-level (data and voice server). The services supported within NAS are described under the Representative NAS Application Types below.

Registration occurs one event at a time. So, if the SP chooses, a multiport device may have the service reestablished for the ports only as they are first used from that location. This minimizes activation to an as-needed basis.

Mobile services are enabled because the INP-NAS dissociates (decouples) the access network from services network. For example, the access network may be a cable operator and the service network may be operated by a specialized telephony service provider (TSP). Decoupling access from service networks, enables customers to reach their service provider via any access network such as cable, wireline, powerline, fiberline, wireless, cellular, etc. without having to establish a separate access account. The traditional mobile network architecture encumbers the service providers. The Home Location Register (HLR) data are transported to the Visiting Location Register (VLR) when registration occurs which limits innovation through commoditization. With these solutions, unless the service is functionally and operationally identical across provider networks, portability of services is poor This dissociation implements instant Local Number Portability in which the service provider maintains responsibility for the customer's service and TN identity and the customer is free to roam or move geographically.

Remote or Foreign AN authorization from the SR authorizes access billing for the duration of the registration and access is provisioned to that SN. Emergency E911 services are impacted because the original home location of the customer has changed.

Representative NAS Application Types comprise:

1. Immediate Network Access Services (INAS) provide new NAU with network access in order to negotiate services. These may be subscriber services or "on-demand" session-only services. Such services apply to dedicated and remote foreign networks. Examples of INAS are Service Negotiation and Installation.
2. Service Negotiation (S-N) delivers an unrecognized caller to a Business Office or to a subscription screen of a service provider. Automatic identification of the network path and the equipment type of the customer enables the agent to handle service and trouble calls more accurately and efficiently.
3. This invention discloses the INP-NAS information model as well as the transactions needed to complete the processes. After service negotiation, the service management system (SMS) generates an order that is next sent to the provisioning system. Installation NAS must next associate the order with information obtained for the discovered NAU object before determining the final service arrangement in the network to be instituted.
4. Installation NAS improves customer service:
    Installation NAS enables fast and accurate installation of equipment.
    Installation NAS Applications automate the installer process eliminating much of the uncertainty and wasted time associated with provisioning of services. On dedicated networks (such as CATV network or POTS, or ISDN) permanent service can be furnished quickly after Object Discovery, and may be provided without the need for an installation appointment, providing the customer is furnished with an NAU appropriate for self-installation. Thus this service supports customer self-installation and supports traditional technician installation.
5. Repair NAS provides for more rapid and accurate repair activities when equipment is to be replaced or upgraded by utilizing discovered object data for the replacement NAU to be used to substitute it for the faulty NAU.
6. Restoration NAS Applications improves the quality of service (QoS) for communications networks by implementing automatic restoration. This invention provides a method for enabling automatic recovery from service disruptions caused by several events such as human error, electrical interference, and power outages.
7. Network Rearrangement NAS Applications automatically support the rearrangements required, thereby eliminating the error prone and precise work associated with the need to design and execute the engineering changes. The costs and errors associated with such changes are minimized or eliminated.
8. Inventory Management NAS Applications provide more efficient utilization of network resources by allocating them only when and where needed, minimally retaining them in service, and automatically reordering replacement inventory when necessary.
9. Moves NAS provides the ability to detect rearrangements of the access equipment due to a location move, or telecommuting session resulting in the dynamic reassocation of the NAU with the SN. This service supports both permanent and temporary moves and provides roaming capabilities.
10. Security NAS performs several functions.
    a) Registration—identifies whether the Discovered Object is known or is unknown. Several possibilities exist:
        I) may be not registered; or,
        ii) may be registered and must be examined for Authorization Levels, Permissions, Restrictions, or Clone status. Restriction Status indicates whether the Discovered Object is service restricted as would apply to Revenue and Security service treatments. Clone status indicates the Discovered Object is simultaneously in-service elsewhere (to prevent fraud).
    b) Surveillance Services—CALEA® is an accreditation program for public safety communications agencies, a joint effort of the Commission on Accreditation for Law Enforcement Agencies, Inc. and Association of Public-Safety Communications Officials-International (APCO®). CALEA® INAS create an intercept or wiretap upon registration may be offered to governmental or other Homeland Security agencies.
11. Revenue Assurance performs several functions
    a) Billing Revenue Assurance is verified upon each registration when an object is first discovered and registered for access and service. This verifies usage path integrity to ensure that it is maintained when a rearrangement or move occurs.
    (b) Gentle Reminder$^{SM}$ or Gentle Touch$^{SM}$ services enable delinquent account management establish originating call intercepts to notify customer of account issues and to permit customers to respond affirmatively and to establish a connection to immediately resolve account issues. Resolution results in cancellation of the Gentle Reminder$^{SM}$ service. Customer may decline to speak with the service representative at that moment, with originating access being instantly restored but Gentle Reminder$^{SM}$ service will continue to follow policies that determine number and interval of such notifications before service is finally suspended. Benefits to the customer and provider are that dunning calls and letters are eliminated, and that after final suspension occurs, permanent intercept is implemented for the customer to settle the issue. The service account data are not removed from service elements thus permitting simple account service restoration without having to remove and reestablish service. Date, Day and Time of day may be used to determine appropriate intercept schedule so as to minimize inconvenience for customer and service provider. This eliminates lost revenues, additional provider expense, and customer inconvenience as occurs today when service is suspended. It also eliminates the need for new order entry and re-provisioning after the account is restored to current status.

INP-NAS—Immediate Network Access Services (INAS) provides benefits to Internet Service Providers (ISPs), Network Service Providers (NSPs), subscribers, and on-demand customers. Normally a security failure results in "denial of service." In this invention, the "security event" announces that an unregistered terminal object is seeking entry or service. INAS provides a more beneficial service by delivering the interested user to a registration service and upon successful registration the INAS generates and automatically downloads a configuration file (customizing the customer access dial scripts with the appropriate security and login data) so that future dial-up results in a successful access. Said file can take the form of a dial up script, a traditional initialization file, or a cookie enabling subsequent recognition by INAS.

A "pay per session" service is a logical extension of the said INAS described. The INAS could implement with on-demand services to charge by the day, by the session, or by each use (in effect opening up networks to anyone requesting information services—not just for subscribers) by integrating to security and billing services.

PRIOR ART

Object and Network Discovery

All forms of discovery serve to acquire knowledge and information from the managed device. Discovery has been implemented in several forms in the industry. Automatic discovery has been used in data networks implementing SNMP or CMIP and has been used for inventory and security management. It is a polled function where the network management system periodically asks, "who's there?" and processes the responses. However, the standards also allow for autonomous event reports that are auto announcements. VoIP and HSD Modem vendors have implemented an autonomous registration request message (REQ-REG) that causes the network management system to note the presence, request data from the modem, register the device and initialize the device as appropriate. Cable modem vendors have implemented a form of discovery in which the control channels are periodically scanned to institute what is known as 'ranging' or 'marshaling' to synchronize the HDT controller with the modem.

Normally, if the discovered device is not expected or registered, then alarms are triggered and the device is disabled as previously described.

Advanced Intelligent Network

Advanced Intelligent Network (AIN) was developed by Bellcore to separate service control from switch logic. Its primary advantage is that it provides flexibility for offering new services but also independence of vendor services which are often implemented differently. AIN provides these services to line accounts after they are provisioned into the Local Digital Switch (LDS).

AIN defines a formal call model to which all switching systems must adhere. The call AIN defines a formal call model to which all switching systems must adhere. The call model is implemented in the LDS, (known as the AIN Service Switching Point (SSP) utilizes point in calls (PICs), detection points (DPs), and triggers. The AIN architecture introduces the Intelligent Peripheral (I-P) and the utilizes the Service Control Point (SCP) to provide call guidance.

AIN SSP formal call model introduces call states to track call origination to call termination. These states include the null state (or the "on-hook" idle state) when the phone is idle. Other PICs include off-hook (or origination attempt), collecting information, analyzing information, routing, alerting, etc. In this new call model, trigger detection points (TDPs) were added between the PICs. SSPs check TDPs to see if there are any active triggers.

Three types of triggers: subscribed or line-based triggers, group-based triggers, and office-based triggers. Subscribed triggers are specifically provisioned to the customer's line. Group-based triggers are assigned to groups such as all lines in a Centrex group. Office-based triggers are available to everyone who is connected to the telephone switching office or has access to the North American numbering plan.

Normal switching system call processing continues until an active trigger is detected. The SSP then sends the event message to the IP or SCP and awaits instructions before continuing call processing.

Essentially, when the SSP recognizes that a call has an associated AIN trigger, the SSP suspends the call processing while querying the SCP for call routing instructions. Once the SCP provides the instruction, the SSP continues the call model flow until completion of the call. AIN is an event based model which relates to provisioned or established lines. The INP-NAS provides an architecture which is event based and provides services for managing the access arrangement of serving lines prior to provisioning and after provisioning lines in service.

Prior Art Network Access Services

In order to depict the process described herein in detail, a few examples of Prior Art services are explained. These examples are:

Installation of telephony customer on a circuit based network;

Installation of telephony customer on a "Voice Over IP" (VoIP) network;

Service Disconnect to Soft Dialtone;

Network rearrangement; and

Mobile Networks.

Installation Services—Provisioning of Circuit Based Telephony Services:

Service Negotiation: The customer must first call the business office to establish an account and request service. A Telephone Number (TN) is identified or a specific one is retained should the customer request it. This is termed a Local Number Portability (LNP) order. An appointment is scheduled with the customer if there is no pre-existing NAU with available inventory at the service location. These appointments typically require advance scheduling a minimum of one to three days, but can take up to 11 days for an LNP order. LNP orders require longer intervals due to the need to service negotiate and coordinate the transfer. Upon negotiation, third party provisioning functions take place and a Provisioning Work Order is sent to the network provisioning OSS, which manages the details of network provisioning.

Network Provisioning: The network provisioning function entails three principle-provisioning tasks (these tasks expand into multiple provisioning steps). These processes have been automated in the current art by provisioning Operations Service Systems (OSS) and provide operational benefits.

Network Provisioning Steps:
  a) Provisioning of the "Host Data Terminal" (HDT) that is used to service the customer location.
  b) Provisioning the telephone switch that will provide service.
  c) Installation of an addressable "network access unit" (NAU) at the service location.

These steps may change order depending on the equipment capabilities, such as the use of temporary Serial Number, which enables the order to proceed without explicit detail regarding the installed device. Some vendors require pre-identification of the NAU serial number prior to step a). For these equipment types, step c) must be completed first. The execution of step c) first, has the additional disadvantage of having all problems discovered while the installation is taking place.

Step a: Determination of the communication path required providing service:

This determination is made by referencing engineering drawings or by using pre-extracted data. Next a logical communications path between the HDT modem and the FiberNode may be assigned from inventory or the element manager. This portion of the path is termed the proprietary circuit. Next, a carrier circuit must be found between the HDT and the switch. The HDT may indicate an available circuit to a switch. The "Call Reference Value" (CRV), in reference to TR303 types of HDTs, is used to institute the logical cross-connect between the carrier circuit's shareable DS0 and the proprietary channel.

Step b: Switch services are provisioned: Activating telephony service on a line is commonly referred to as setting "translations. The selection of an assignable item from an assignable item from of an inventory is termed an "assignment." Several switch assignment data must be identified. The specified telephony services identified for the TN are selected along with the appropriate "Line Class Codes" and "Line Equipment Number" (LEN), or "Office Equipment" (OE), identifying the port of the switch corresponding to the previously identified CRV. Additional switch provisioning information such as a "Rate Exchange Area" (RAX) is also specified. When these are assembled, the switch may have the translations loaded for the TN.

Step c: Installation: Several calls are needed to complete installation. One call to the provisioning center to identify equipment, another call to the test center and yet another call to the provisioning center to complete LNP transfers. The installer must use a cellular phone, wireless device, or "borrow" a nearby idle line.

The telephony service requires the NAU to be registered and marshaled and the circuit to be provisioned in the switch to the installed NAU. Dialtone provided by step b) from the switch will appear on the provisioned port of the installed NAU.

The installer may choose to install the new NAU as anticipated above, or may choose to provide service from a nearby NAU if it is within cabling distance. This installation is termed a "split NAU" and is done to save considerable time and to more efficiently utilize capital equipment.

If an NAU is split, the technician must call the provisioning group to request that the provisioning be redone. This takes time and is error prone.

The NAU to be installed must be pre-registered to prevent an alarm from being generated. A provisioning Temporary Serial Number (TSN), or an electronic serial number (ESN) of the unit to be installed must be provided to the provisioning center or entered into a port on the NAU. When the TSN or ESN are used, the installed equipment is associated with the provisioning order.

After registration, the HDT modem will range or marshal without generating an intrusion alarm.

Calling a test desk using a cellular phone, wireless device, etc completes tests of the service, such as incoming call completion and dial origination.

Finally, a call is made to initiate LNP activation to complete the service.

Installation Services—Provisioning IP Telephony Services

IP networks support multimedia services and provide operations advantages for the network provider and customers. Standards, such as Data Over Cable Service Interface Specification (DOCSIS), Advanced PHY, PacketCable, and future standards, will enable portability of IP based NAU equipment, termed the multimedia terminal adapter (MTA), that can be used across multiple vendor networks. Other specialty access device types include SIP phones. For purposes of this invention, these are standards based and will work with this invention as combined adapter and terminal devices.

One advantage of the DOCSIS standard is that the multimedia terminal adapter (MTA) might be more easily installed. There is no inherent association of address to serving node, which eliminates the need for a network SAG. The MTA must be pre-authorized with the network before service can be obtained. This is limiting when new multimedia services are requested.

In the current art for IP based services, comparable provisioning installation steps to those used for the circuit telephony scenario above are needed:

The customer must call the business office and establish an account for an order to be initiated. A TN is assigned and an installation appointment is scheduled.
  On the due date, the installer calls the provisioning center and furnishes the order number to prepare the network to recognize the new MTA. The call must be made from an active phone line or a cellular or wireless phone.
  The installer installs the MTA, which sends a registration request (REG-REQ) to Network Management and Activation System (NMAS) which records the MAC address, assigns non-routeable IP address, and downloads temporary Configuration data. (At this point, the specific customer service association is not completed.)
  The installer enters account number and order number into MTA data configuration port, which sends a message to the NMAS, which next associates these records for the service systems, such as the CMS (Cable Management System).
  The installer then reboots MTA in order to get the MTA to send a new REG-REQ to the NMAS, which now understands the association to specific service.
  The NMAS records the MTA MAC address, accesses customer information, assigns routeable IP address and downloads correct customer specific configuration file.
  Service is established.
  Calls to the test center must be made to test call completion and origination.
  A Call to the provisioning center is made to initiate LNP activation.

Service Disconnect and Impact on Network Utilization

When a customer terminates service, a disconnect order is issued. Providers benefit by implementing a SDT service because this saves dispatching a technician to remove and subsequently install the service when the next customer requests service at the same location. SDT is assigned to the line for a number of days after any disconnect occurs and is sometimes required to be permanent if Public Utility Commission mandates. A first order implements SDT by potentially changing the name and TN on the account and changing to a LCC which blocks originating calls except for E911 and access to the business office. A second order is usually scheduled between 30 days to 90 days and creates the final disconnect which occurs when the NAU is recovered back to inventory.

If another subscriber at the same location orders new service (as might occur in the event of a move), then the new subscriber will take over the account and the service can be activated without the need for a dispatch. The allocation of the SDT switch resource ties up inventory and generates the second order that must be cancelled if another subscriber at the same location accepts service. If the order is not cancelled properly, the new subscriber's service will be terminated creating a trouble call.

Network Rearrangement—Capacity Management Related Service Requirements (Circuit Switched Services over a Cable Network):

Engineering must periodically perform network capacity management services. If additional network capacity is needed in a network, engineers have to make the network larger and therefore "grow" or "split" the "FiberNode Service Areas" (FSA) into two or more FSAs. This function is needed to maintain the ability to service customers and maintain a high grade of service as the numbers of customers requiring service are added to network segments. This ensures that subscribers are given the same service that they had prior to the network engineering change. The process of re-configuring the network typically requires cabling to be moved and perhaps hundreds or thousands of switch translation changes to be performed. This requires substantial inventory management associated with LEN/OE and CRV reassignment. The reference to CRV is understood to pertain to TR303 types of remote terminals. However, in the case of a TR008 remote terminal the word "port" is recognized, applicable and substitutable for CRV. Also, from a switch point of view, the HDT appears to be a remote terminal. Existing databases must be accurately restructured in order to maintain service. Retranslation of network elements may be necessary; when the service path is rearranged, the LEN/OE/CRV and other assignments will change. Done improperly, this activity negatively impacts the QoS and has high associated costs.

Multi-hosting addresses capacity exhaustion by allowing several switches to serve a common HDT. This is similar to having overlapping FSAs. The association of an address to a unique serving network becomes ambiguous to ascertain by examining network maps.

Mobile Networks

Traditional mobile networks provide relative access independence. Within the access network of the provider, registration to the Base Station and MSC results in instant service establishment. These services are provided within the MSC.

In the traditional mobile art, access hubs aggregate service data for purposes of establishing service hand off ensuring continuous operation while customer is in motion. Effectively, while in motion, the session and higher layers remain constant, while the lower layers of physical, data, network may be changing.

When a customer becomes a visitor by roaming into a trading partner network, roaming service is offered. In this arrangement, the foreign provider (a.k.a. visiting network provider) performs device registration, and requests access authorization from the Home network provider. When authorization is granted, the foreign provider assumes the host role and delivers service from it's network after transferring Home Location Register HLR data to the Visiting Location Register VLR so that service might be granted in a manner subscribed to by the customer. Upon completion of the session, usage and billing data are transferred back to the home network provider. The difficulty is that services are relegated to the lowest common denominator and as more complex and new services evolve, they will become less and less portable.

Emergency 911 and CALEA® services are provided to the jurisdictional PSAP of the foreign MSC.

Problems Associated with Prior Art:

Prior Art entails the mechanization of manual provisioning and installation processes. As such, there are numerous limitations and points of failure. AIN services apply after provisioning is completed and does nothing to improve these issues.

Provisioning Accuracy: It is not currently possible to achieve 100% accurate provisioning because of data quality. A number of data related problems must be resolved to successfully provision a subscriber's service.

Any one error in the assignment of data from inventory will result in a failure to institute service. When dozens of data elements, each having less than 100% accuracy, are used to provide service, the probability of service fulfillment generally drops significantly (typically ranging between 60% to 95%). In the event that service is not properly fulfilled, the difficulty of locating the provisioning problem is tedious and time consuming.

Inventory data containing physical and logical resources identify both in-service and available network elements and resources. The service address to FN and HDT node associations must be accurately stored in a database similar to the common "Street and Address" Guide (SAG). The accuracy of these data ranges can be from 60%-95% due to the ambiguity of addresses on network maps. These data are costly to collect and make 100% accurate. Additionally, the transport inventory must be correct to avoid a conflict when LEN/OE/CRV assignments are made.

Service Delays: If a service cannot be customer-installed, a technician is required. Technician appointments must be scheduled weeks in advance.

Installation Delays: If the installer encounters data problems, installation will take longer than expected, and can cause subsequent appointments scheduled for that day to either be missed or delayed. Additionally, the probability the customer will cancel service increases significantly. Installation objectives and customer satisfaction metrics are negatively impacted; and if cancellation of service occurs, the company will lose revenue. Installation costs rise due to necessary overtime.

Alarms: There are between hundreds and tens-of-thousands of active alarms in the network at any one time. As described, unregistered discovered objects generate alarms that further overwhelm the service assurance centers and they are not able to deal effectively with valid alarms. A high degree of data overload may cause a lower grade of service because network technicians become desensitized to alarms.

Other service affecting problems: One area of network engineering that impacts network quality of service and has high cost is network capacity management. In the event that additional network capacity is needed in a CATV network, engineers sometimes plan an "FSA split" into two, or more FSAs. The consequence of the reassignment is that a customer may be assigned to a new management domain or realm which then associates them with a different management system. If not done accurately, surveillance and usage records may get dropped (lost) resulting in poor availability or lost revenue.

Staff Efficiency:

Human interactions introduce more errors, delays and inefficiencies into the process. Fewer lines are placed into service than if no interactions were required. Communications required between the installer and the provisioning staff is inherently error prone when it human transcription and/or entry are required. The installer must remain on-site to test the telephony connection and provisioned services before leaving for the next installation. These steps require multiple calls to the service repair centers or to test lines. The installer must either use a cellular or wireless form of communications, or must "borrow" an idle in-service line; the network communications at the site are unavailable for installer use.

Quality of Service (QoS): The second disconnect order issued may result in disconnecting of the new subscriber if the order was not properly cancelled. The second order to disconnect service entails extra workflow management, increases the order volume and potentially creates troubles.

Service Assurance:

Detection of Customer Service Problems: Once service has been provided, customers, who then register complaints, often are the first to discover network service problems. Network outages due to power failures, lightning, or other impairments, may cause the equipment to lose the proper provisioning associations. Current networks have limited ability to recover from these outages.

Fraud and Security:

Fraud is normally detected after loss of service occurs by the customer who disputes billing charges, or by billing related audits. Many millions of dollars of revenue are lost annually due fraud.

Lost Revenue:

"Revenue Leakage" is a term used in the industry to denote accidental failure to account for usage resulting in failure to bill for services rendered. This occurs if associations are lost from human error or network rearrangements or changes that cause the service usage data to not be collected for subsequent billing. This results in many millions of dollars annually and is only found via routine audits with manual reconciliation done at great expense using specially trained personnel.

Field Operations:

Repair or field operations resulting in replacement (swap) or upgrade of NAUs are labor intensive and entail accurate reprovisioning of each line in service as it is moved from the old to the new unit. Field rearrangements are time consuming and must be accurately recorded to maintain the integrity of inventory databases.

Foreign Network Registration Services

Many Home Networks permit remote registration via foreign networks but mobility is impaired if the customer must first establish an access account. Multiple stages of registration are required to operate remotely which introduces service delays and added expense. For example, in the case of VoIP services, the customer must set up a foreign access account to obtain broadband access. Then the remote-user must register their equipment with their primary VoIP provider via registration scripts or keystrokes that support a registration dialog to establish 2-way services. In the event of ISP network services, access might be achieved via dial-up access or using PVC data service. Registration is accomplished via login scripts.

Mobile Session Bridging Service

For mobile networks entailing intra-session handoff, service continuity is poorly managed when the a caller momentarily, or loses signal networks get congested due to congestion in the next cell resulting in no available resources to maintain the service.

The customer is left with no recourse but to begin redialing which often results in the network routing the call a voice mail system because the MSC still indicates the call is in progress. Often, both customers begin redialing one another in an effort to reestablish the call. The result is customer annoyance which increases with each attempt to re-establish the interrupted call. This action results in multiple attempts that are often billed at a minimum usage charge, and which will create two or more billing records resulting in multiple charges for the interrupted call.

BRIEF SUMMARY AND OBJECTS OF THE INVENTION

The Intelligent Network Providing Network Access Services (INP-NAS) overcomes or alleviates problems of the prior art and implements an architecture and services for communications and information networks. Based on Object and Path Discovery (events reporting the state change of a network element), the invention automatically initiates services and management applications benefiting Network Providers, Service Providers, and customers. A service controller (NAS Application Controller) provides these applications and integrates with management systems and provisioning systems to provide services described herein.

Object Discovery, the technology enabler for this invention, provides data collection of the object and network path for use by the NAS Applications. Object Discovery reports significant events (state changes) such as; unit on-line or off-line, device reset, power interruption, network rearrangements and changes, installation and construction activities, and other things affecting the network seeing this object. The primary benefit of the Object Discovery is that it minimizes dependency on pre-collected data, reduces procedural burdens and uses far less manpower.

This invention provides ease of access and service quality services to customers, and revenue generation and operations savings services for network providers and service providers. The access services are implemented as NAS Applications.

BRIEF DESCRIPTION OF THE DRAWINGS

The drawings depict the functionality of the invention as it pertains to provisioning telephony on a CATV network.

FIG. A1—Illustrates the information commerce functions of the INAP Global Information Service Network;

FIG. A2—Illustrates alternate Global Information Service Network configurations;

FIG. A3—Diagrammitical illustrates CM provisioning under INAP in accordance with the present invention;

FIG. A4—Diagrammitical illustrates CM provisioning flow in accordance with the present invention;

FIG. A5—Diagrammitical illustrates MTA provisioning flow in accordance with the present invention;

FIG. A6—Diagrammitical illustrates MTA provisioning flow in accordance with the present invention;

FIG. 1 illustrates the platform architecture of NP-NAS;

FIG. 2 depicts a top level network access service (NAS) control flow;

FIG. 3 depicts an immediate Network Access Service (NAS);

FIG. 4 depicts nomenclature of the Switch (LDS);

FIG. 5 identifies nomenclature of the Host Digital Terminal (HDT);

Figure 6:
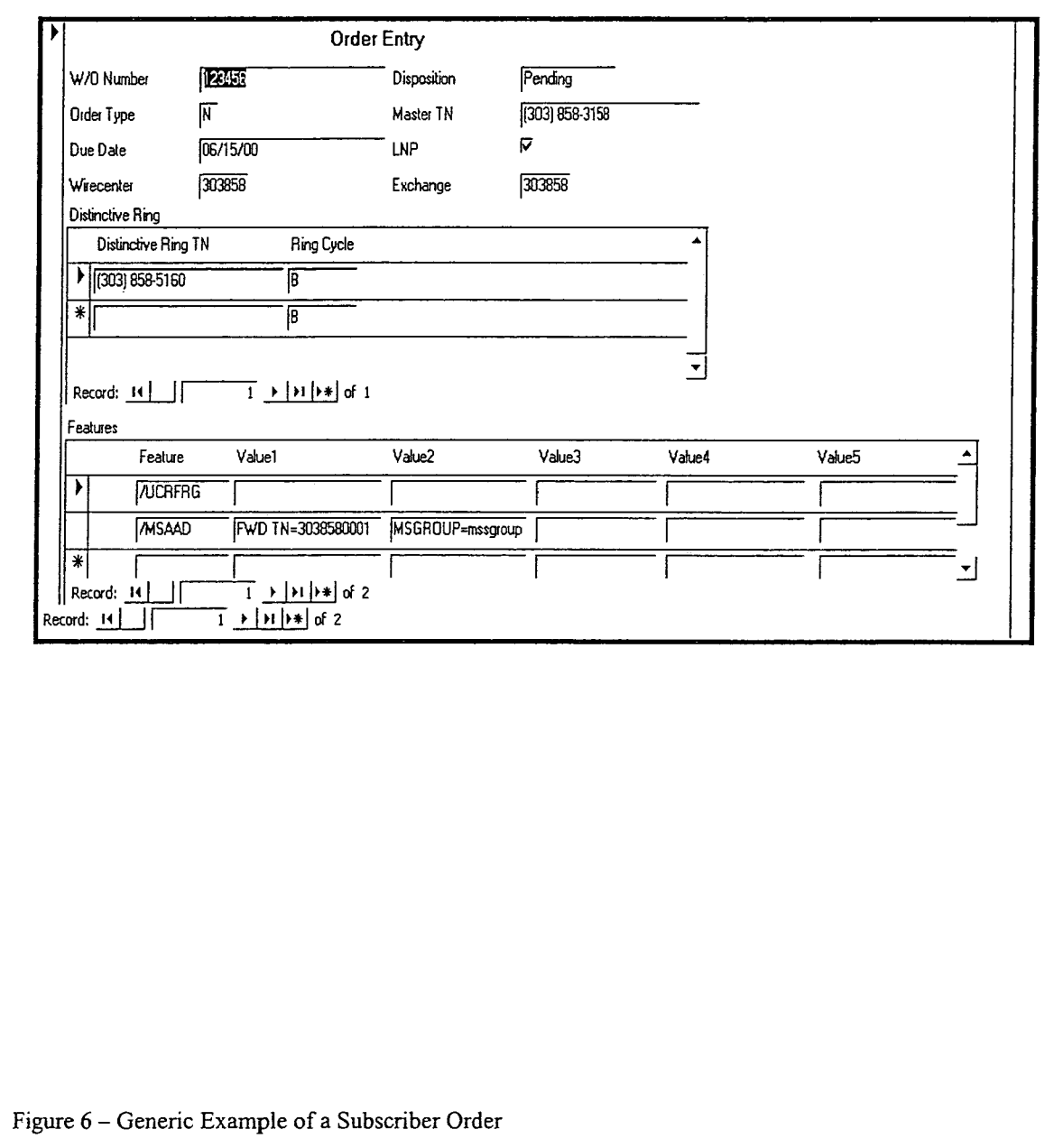

FIG. 6 illustrates a generic example of a subscriber order;

FIG. 7 depicts the Object Discovery message arriving from the HDT upon the event that an NAU was powered dup on the CATV network;

FIG. 8 shows the correlation that occurs between the object discovery message (FIG. 6) and the static data that was maintained about the HDT (FIG. 4);

FIG. 9 illustrates the manner in which an in-band communication path is established to enter IVR information;

FIG. 10 depicts the information that is transferred from the installer to the NAS via the IVR;

FIG. 11 illustrates how the information is used to establish to in-band communications channel in correlation to the original Work Order; and FIG. 12 depicts the relationship between events and services to Object State Diagram.

DETAILED DESCRIPTION OF THE ILLUSTRATED EMBODIMENTS

Features

A set of Network Access Services (NAS) for circuit and VoIP telephony are descripted for CATV networks. These services can be easily extended to other network types.

With NAS Applications, a new NAU Object Discovery results in the creation of a Registration MIB (management information base) and a corresponding event transaction (001) that initiates the NAS Applications Controller (006). Object and path discovery results in 100% accurate data being supplied for use to services because the information comes directly from the network elements. Discovery occurs in the access network of the HDT/HDT Element Manager.

The NAS Immediate Network Access Service will be described via the architecture depicted in FIG. 1.

If NAS Controller (006), upon detecting the NAU, classifies the NAU as customer installation, it next assigns a hot-line (LDS hot-line pool is managed by Controller) and registers TN in Registration MIB for one or all available ports of the NAU. Phone is next connected to one available NAU port. The hot-line (aka, a Ring Down Circuit) can also be instituted upon demand as depicted and described herein.

Two methods for initiating service are described: a) Customer may be automatically alerted from NAS Controller and answers phone; b) Customer originates a call from phone.

Customer is greeted with a welcome message from LDS, and may select emergency service "E911", and is immediately transferred to the CRM center where service negotiation takes place. Said transfer occurs via LDS hot-line (002). The hot-line "Automatic Number Identification" (ANI) of the TN is recorded by the SMS (008) and is subsequently passed with the order to Provisioning OSS (007) to complete provisioning and service activation. Service can be active within a few minutes after the order is taken.

For technician-installed equipment, the customer must have previously ordered service. If NAS Controller (006), upon discovery of NAU classifies said NAU as installer type, it assigns a provisioning IVR hot-line. The installer is alerted from the NAS Controller and answers phone.

The "Local Digital Switch" (LDS) hot-line (004) delivers technician to Provisioning IVR for login and awaits instruction and supplemental information to be entered. Provisioning IVR forwards collected information such as work order number and the ANI of the hot-line. The work order number is needed to correlate existing Provisioning Work Order with Registration MIB data. The ANI (TN) of the calling line enables NAS controller to store supplemental information in the appropriate the Registration MIB. Provisioning OSS completes service activation within minutes.

The first advantage of the invention is the virtual elimination of the dependency to predefine. Said data is initially inaccurate, or subsequently becomes inaccurate by changes that are incompletely recorded. The second advantage is that the reliability and performance of critical functions, such as provisioning is made more predictable having the benefit of improved customer satisfaction through fewer missed appointments, more reliable installations, etc. The third advantage is that customer self-installation is more likely to be possible. The fourth advantage is that the current provisioning OSS becomes vastly simpler to design and manage. Fifth advantage being the cost of initial data collection and storage is vastly reduced.

FIG. 2 illustrates how the Autonomous Discovered Object Event, plus element and path data are used to initiate specific NAS Applications services.

The NAS control flow depicted is representative of a logical ordered sequence wherein first consideration is given to new service requests, and second to recovery and restoration.

If a new NAU object is discovered (object not registered) then Immediate Network Access Service (233), shown in FIG. 3 is started. This service can support technician or customer installation when the object type is recognized, or initiate security services when the object type is unrecognized.

If a discovered NAU was previously registered and is still at the same location, it is assumed to have had some service interruption. In this case, the Recovery Service (234) is performed. Recovery will seek to verify the translations in the network elements (HDT, LDS) are correct, and if not, will correct it.

If a previously known NAU is rediscovered, but is now found to be at a different network location, the NAS—Rearrangement service (241) is initiated. NAU association with a different FN and HDT, or other network element detects such rearrangement. The customer may have simply moved within the service area of the network. In this case, the Reprovision Switch "from-to" service (238) is run. This move is treated as legitimate and is used to trigger the HDT Reprovision (237) to restore (or move) the service arrangement of the network. If the move is not legitimate, then the customer would need to terminate or cancel service that will result in the service disconnect.

Global Information Service Network (G-ISN)

The basic concept described in the original invention is the intelligent AN offering a collection of specialized access services. The control realm (domain of the SR) consists of all access nodes managed by that particular SR.

Within the G-ISN, plurality of access nodes can be networked. Thus, regardless of which node a service request originates, AN to SR message exchange can be used to obtain authorization from the SR to authorize binding with the identified SN.

AN device registration requires the use of a unique key such as Electronic Serial Number, or the device MAC address. MAC is the Media Access Control address used in network types whose protocol is defined in the 80X series of IEEE network standards, such as 802.3 which defines the CSMA/CD bus standard known as the Ethernet protocol. Other 80X standards address token bus and ring, metropolitan area networks, etc. MAC address is unique to the manufacturer and identify the network access device.

After initial object discovery and registration occurs within the AN, an identification process begins by the AN transmitting a multicast registration request to all SR trading partner nodes to determine account ownership and service status identifies the SN. If registration is accepted but is found to be actively registered within the more than one AN, then the SR must determine whether the registration is currently active. If so, SR must initiate auditing and appropriate security treatment to determine if fraud is being perpetrated. If only one SR acknowledges ownership and authorizes the AN to connect the customer for service, then the AP completes normal registration and binding to the specified SN. Services FIG. 3 illustrates the flow for two scenarios for Immediate Network Access Service: (130). A new discovered object (unregistered) is first type classified as either customer installable, technician installable (128), or unknown. Discovered object and path data are then stored in a Registration MIB (117, 118).

Security first determines identity and service authorization status of the customer. Service status must be verified globally. If the object is not authorized by any node, then Immediate Access Services, with optional SR brokerage service, is offered.

Customer Self-Installation:

Customer self-installed NAU: NAS Installation, upon classification, the service automatically initiates AN configuration to assign each port of the NAU to a specialized INAP-Call Agent that detects access state change. The Call Agent is hosted on a Donor LDS which may be associated with the AN or with a TP SN. When a new line is activated, the Call Agent routing caller to the IVR where customer hears a welcome message, or may optionally select E911 service, but is immediately transferred to the CRM center where service negotiation takes place. E911 service is routed to the AN jurisdictional PSAP.

Upon selection, customer is call forward to SR Business Office. Call Agent assignment implements a hot-line from a pool (127), and INAS records the TN and port in use in the Registration MIB. The customer may establish service and upon completion and disconnect, the service then alerts the phone connected to specific port 1 of the NAU (116) that the service is established. All available ports may be pre-assigned in this manner so that the service is available to all ports without preference.

Two methods for initiating service are described: a) Customer may be automatically alerted from NAS Controller and answers phone; b) Customer originates a call from phone.

The CSR has a display that indicates the NAU was discovered. The ring down line is referred to herein as a hot-line. The CSR next enters the order into the Service Management System (SMS) that forwards the Work Order to the provisioning OSS. One function of the SMS will be to record the ANI of the hot-line in the Work Order and used later by the provisioning system and NAS Application Controller to associate (correlate) the ANI with the Registration MIB data previously recorded. The hot-line TN is of temporary value and serves only the purpose mentioned.

Technician Installation:

Technician installable NAU: Network powered NAU (requiring a qualified installer), upon classification of installation type, assigns a provisioning Integrated Voice Response Unit (IVR) hot-line (129). The service records the ANI of the hot-line in the Registration MIB. All available ports may be pre-assigned in this manner so that the service is available to all ports without preference.

Two methods for initiating service are described: a) Technician may be automatically alerted from NAS Controller and answer phone (121); b) Technician originates a call from phone.

Automatic connection to the UVR then enables the technician to complete the installation and activation process. The ANI of the hot-line collected by the IVR allows the correlation of IVR data entered by the technician with the provisioning order and Registration MIB to complete the association.

Immediate Network Access Service will also automate subsequent technician activities for testing and LNP transfer are automatically sequenced and managed. For example, upon activation, completion is signaled by alerting port 1 (123). Upon answering, the technician is given a voiced message that the local service is active (incoming call completion test), the technician may then signal that the LNP activation should occur and hang up (125). The service will then activate LNP and when confirmed, again place a call from the local switch to port 1 and voice a message to the technician that the LNP activation was successful (136). Note that the technician only used communications services provided by the network and did not need to use a wireless phone or other alternate communications means to implement service.

Restoration and Recovery Services:

These services provide a "self-healing" characteristic to the network and will improve the service, resulting in higher Customer Satisfaction incurring fewer trouble reports and alarms. Reasons for restoration or recovery services include electrical outage, NAU removal/insertion, or a lightning strike, customer actions, installation actions, or repair activities, engineering planned network rearrangements, network failures, etc.

Restoration: Service restoration is important as network troubles, moves, rearrangements, work being performed, or other disturbances could result in loss of service to customers. If the same service arrangement exists, but for some reason a new discovery occurs for an in-service object, recovery is initiated wherein all service elements are verified for correctness.

Moves and Changes

The connection of the access adapter (containing NAU intelligence) is all that is needed to activate the service without human intervention. In the case of long term (subscription) service, it supports moves of the terminating NAU across the network. In the event of a permanent move, the AN registry would be updated to reflect the association between object, AN, and SR.

Moves:

If the NAU object is recognized as being in-service, is discovered to be at a new access point, then service must be reestablished to the new access point. The access path must be altered, but the service node remains the same.

For temporary moves of a few hours or days, networking NAS service implements "remote access" where services are extended to the new location without the need to enter a change or move order. The service implements a plug-and-play model permitting both terminating and originating service transparency. This capability supports telecommuting applications.

For moves that become permanent, this service overcomes a major scheduling and timing problem by moving the service to the new location first temporarily, and after corporate policy deems the move to be permanent, it requires that the service location information must be updated for billing and E911 services. The advantage of this approach is that: 1) moves need not be scheduled in advance; and 2) service is assured when the move actually occurs.

Recovery:

If the NAU object, being previously in-service, is rediscovered (i.e. possibly resulting from an electrical outage, NAU removal/insertion, or a lightning strike), then the Recovery is initiated. Recovery may or may not require any reprovision of elements, however it is important to first verify and correct element translations in order to ensure that service is being provided. If the NAU object is assigned to the same switch, then a switch translation problem might have caused the service disruption, and the switch provisioning should be verified, utilizing NAS—Verify and Restore Switch.

Rearrangement:

If the NAU object has been rearranged (i.e. moved to a different HDT, FN, or host switch), reprovision services are used. For example, NAS—Reprovision Switch "from-to" to effect the move of the TN account "from" the old host switch "to" the new host switch. Legitimacy assumptions apply.

Provisioning IP Telephony using NAS Installation Service
For the IP Telephony scenario, this invention can provide a variation to the Immediate Network Access Services suitable for VoIP services. It requires a modification to the process described above. The process flows described apply, however, the signaling and control specifics differ for IP Services.

Customer self-installation will be described as exemplary, because this is the most logical application for a newly discovered MTA.

For cable data services, the connecting adapter is called a Cable Modem (CM), and the adapter which converts VoIP service is called a Media Terminal Adapter (MTA). When combined the industry is known as the Enhanced-MTA (E-MTA). These adapters are provisioned in two stages, first the CM, and subsequently the MTA. The CM may optionally indicate that MTA registration will follow.

FIG. A2 illustrates the three arrangements that depict the full interoperation between Access Provider and Service Provider networks. Service is provided only by the designated SN. G-ISN policies must be established for the following scenarios to work properly. For example, when the AN attempts to locate the SN for the customer, one G-ISN policy is that only the designated SR may identify itself as Primary to authorize the customer for service, and must verify account status is in good standing. The first scenario shows a customer in their Home (primary) network obtaining local access. The second shows a customer in a remote access network which must locate the Primary SN for service to be established. The third shows a new access from a Remote network that may be brokered to a selected TP SN.

VoIP Service Scenarios:

1) Home AN identifies discovered object and reestablishes service in normal fashion. If it cannot identify discovered object, then INAP-RS checks with data DHCP server and if unsuccessful, then multicasts request to TSPs.

2) AN requests and receives authorization for the discovered object from SR which identifies P-SN. INAP-RS returns the "DHCP Offer" to MTA which next sends DHCP Req message and the INAP-RS must request local IP address assignment that provides access under terms of the Interconnect Agreement. INAP-RS requests registration from P-SN and returns a new DHCP ACK response combining information from P-SN providing FQDNs of device and CA, etc. with local addresses. INAP-RS registers the local address with the host DNS.

Under terms of the IA, the gateway and RKS must be provisioned to measure usage for foreign access billing to Primary SP. Device provisioning must be completed using standard configuration files and process established from the Primary SP.

3) AN requests, but does not receive, authorization for the discovered object from any SR: INAP-RS classifies object as a new device and establishes broker service: AN may assign a temp license restricting access to brokerage and subscription services. Customer hears welcome message and is offered options to select SR, call for emergency, etc. The address for the selected SR must come from the TP MIB based on the IA agreement. This, in effect, implements the Business Office hot-line service from AN to SRs. Cases:

a. Customer hears message but decides to abandon access and terminates session. Instant Access Service is terminated.

b. Customer desires broker service and enters selection resulting in INAP-RS transfer to selected SR business office.

c. Customer currently has an SR but is using unrecognized (new) equipment and desires service to be established via new devices. Customer selection of P-SR enables transfer to business office for account verification and service establishment. SN policy will determine if two different NAUs will be permitted to be registered to the same account. Equipment reconfiguration may be necessary because a new NAU is required through a different AN network (e.g. DSL rather than Cable).

The customer picks up phone, and hears a welcome message and is transferred to the Business Office to order service. Alternatively, the customer receives an automated call, answers phone, receives a welcome message, and is transferred to the Business Office to order service. Service is negotiated and the SMS sends the Work Order containing the ANI of the hotline. The customer service representative is provided with data that indicates for the type of equipment discovered the type of services that can be ordered. Upon completion, customer hangs up phone.

The order flows to provisioning OSS within the SR. The hot line ANI permits correlation to the INAP Registration MIB.

The OSS interacts with NMAS and provisions CMS (Call Management System) and assigns routeable IP address and downloads correct customer specific configuration file to the MTA.

The MTA line 1 phone is signaled and the customer is sent an IVR message confirming that service is active and prompts for customer acknowledgment of service quality. If customer indicates satisfactory service, then the LNP transfer occurs to complete the telephony service. If customer indicates unsatisfactory service, then the customer is transferred to repair.

Emergency 911 and CALEA Services

Whenever a discovered object registration occurs, INAS-RS requires the AN to identify PSAP to SN when binding occurs, so that correct jurisdictional PSAP transfer is available for the serving location of the current AN. Thus, any change of access point results in registration based association for the correct PSAP.

Advantages and Benefits of the Invention:

The advantages include reduced expenses, increased service quality, with higher revenue generation for the network provider that implements this NAS invention. By supporting customer installation, the flexibility of obtaining telephony INAS on a time frame that is amenable to their unique schedule, i.e. no installation appointment is necessary by applying this invention.

- INAS provides instant communications service to customers eliminating the need for a qualified installer. This invention allows subscribers to install their own service equipment eliminating the need for an appointment and installer.
- This invention automatically guides the subscriber installing equipment directly into the business office enabling INAS. INAS includes service negotiation and service activation.
- Improved Customer Servicing—Information regarding the customer's reason for call, equipment type, serial number, number and type of available ports, and other details can be furnished to the business office or repair office improving the servicing and quality of call handling. Multiple service NAUs such as voice and data for circuit networks, or for IP networks can be better serviced.
- Both the installer and customer utilizes the pre-service communication path associated with the NAS—Installation and need not use a wireless telephone or "borrow" dial-tone from an idle line. All service are provided by the newly discovered equipment. Alternate means of communications are only needed in a limited number of cases when service does not complete successfully.
- Quality of Service: A higher degree of service accuracy is possible. The 95-97% accuracy (typically the best case) for data increases to nearly 100% because it is furnished "just-in-time" when needed via the access network.
- Costly data collection and maintenance are virtually eliminated. The benefit is reduced cost and less time wasted. The need to maintain data is eliminated since it is furnished only when needed by the network.
- No prior knowledge concerning a subscriber's service location need be collected and saved in inventory databases prior to provisioning the required telephony services.
- No relationship between a subscriber's location and the HDT need be pre-defined in databases.
- A pre-determined inventory is not needed: Rather than storing inventory in separate databases, querying the underlying network elements makes CRV and/or LEN/OE assignments.
- Costly installer time is reduced because the process is automated for the installer.

The invention automates the installation sequence. The installer's time at a subscriber's service location is minimized. Therefore, installer efficiency is maximized and the number of installs that can be completed each day increases.

- The customer and installer are alerted as installation progresses, eliminating the need to "watch" progress indicator lamps.
- The installer need not communicate with any other person when placing a NAU. Communications are only required if an error condition arises or if the installer wishes to communicate with provisioning personnel.
- Speeds the replacement/repair process by allowing services provisioned onto one NAU to be easily transferred to another.
- Allows for the automatic reconfiguration of service if the network is re-engineered. Subscriber service integrity is maintained with minimal, if any, human intervention.
- Provisioning of lines having standard service packages is possible by assignment from pools of identically provisioned lines. The benefit is that provisioning which is time consuming and costly in terms of switch load, can be moved to low traffic hours permitting faster service activation.
- Inventory of pre-established hot-line and permanent resource pools can be kept to a minimum by "just-in-time" association with a corresponding inventory replenishment order being generated.
- Mobility services would "follow" the access location of existing customers Telework or Telecommuting applications are possible where the entire service set assigned to a customer would be made available simply through a plug-and-play access of the NAU to an access network connection. Office moves and facility moves would not have to be scheduled in advance and the service would be instantly available at the new location selected. This overcomes a scheduling logistics problem often encountered which impacts worker productivity due to transit times, setup times, schedule changes, etc. making the new work site not instantly suitable for work. This invention enables the worker to locate wherever appropriate until the environment is suitable for work, and then instantly move the service into the new location.
- Specialized or advanced information services can be best and perhaps only be delivered by the primary SN. For example, calling plan discounts cannot be managed within the primary SR plan because the foreign host has their own charge-back schedule, etc. ISP, ASP, DSP, etc type SNs do not offer standardized services that would enable a foreign provider to assume the host role except for simple services such as internet access. Nor do they want the service profile details exported to another provider.
- For mobility services, the INP-NAS mobile session bridging service provides a session agent that manages session persistence if service disruption occurs (not due to a valid end point disconnect). Session agent, detecting a new registration will reconnect the two end points of the prior session. Benefits include maintaining a higher quality of service for the customer. This is significant in that the traditional customer action entails multiple redial attempts to contact the other party, often with both parties attempting reconnect. The result is that calls will often be diverted to voice messaging systems, which then must be dropped before another attempt can be made. It is not uncommon for several calls to be made in succession before the parties are able to resume the session.

An INP-NAS mobile session bridging service managing usage accounting can properly adjust for disrupted sessions, so billing is simplified.

INP-NAS differs from traditional cellular network roaming services offered in that INP-NAS establishes a G-ISN comprised of the SN and foreign AN. The foreign access provider network does not assume role of the host SN. With INP-NAS, the P-SN is always used, while the access changes.

The Concept

Conceptionally, the following brief comments concerning the several Figures will be helpful to an understanding of the present invention.

FIG. A1 illustrates the information commerce functions of the INAP Global Information Service Network. The functional entities shown are the customer (001), the Primary Service Retailer (002), the Access Network (003), and the Service Network (004). The SR is the brand identified vendor responsible for the account and for establishing the virtual information service network. Each business entity may be combinations of functional entities. The customer attaches to the access network via a service adapter and NAU. Trading Partner Agreements (TPA) are shown to establish the contractual relationships between entities.

FIG. A2 illustrates alternate Global Information Service Network configurations. Primary Service Retailer (000) maintains business office and manages the G-ISN assignments for customer. A Home Network consists of the primary access (001) and service networks (002) assigned to the customer service location. A mobile customer device achieves access via a non-home Access Network (003) which establishes local service automatically to the Primary Service Network (002). In a third configuration, a new device attachment results in Access Network (002) providing brokerage service, and upon selection, provides instant service to G-ISN Service Retailer (000) business office to establish service from the New Service Network (006).

FIG. A3 illustrates the normal initialization sequence for the Cable Modem (CM). The FIG. A4 flow chart indicates the several additional CM-1 message exchanges necessary to support G-ISM when an unregistered device with A, DHCP, the DHCP will send to INAP a message seeking authorization. For VoIP service, the Offer request contains a VoIP option code, and INAP will next multicast the request to the Service Retail (SR) group seeking Primary SR approval. INAP will record the Primary SR and then signal DHCP to assign a permanent address.

FIG. A5 illustrates the MTA Provisioning steps that appears normal as the sequence begins with MTA requesting Offer (301). However, because G-ISN supports multiple providers assigned to ports of a single device and additionally supports access independence, the remainder of the sequence is altered form the standard form.

MTA-1 (302) identifies provider and obtains access authorization by sending the Offer request to SR providers in G-ISN.

FIG. A6 illustrates the MTA Provisioning Flow is illustrated in FIG. A6. Additional steps appear in this figure that cause the INAP server to seek obtaining approval form the SR if the DHCP server does not recognize the registering device. In this case, the INAP will seek to establish device ad port management ownership, and properly administer the device to enable services for each claimed or unclaimed port in accordance with the cases below. Cases:

a) No offer is received: The device is assumed to be in use for the first time, and service brokerage is assigned by default by completing the provisioning sequent and providing the MTA with a default configuration file that defaults each port to the INAP-CA which sends the user to the IVR providing brokerage service.

b) Only one SR respond: The MTA is authorization is confirmed with an offer response (303). When the MTA requests a permanent IP address (304), INAP will forward the request onto the SN-DHCP for assignment. Any unclaimed ports must default to be assigned to the INAP-CA as in case a) above.

c) More than one SR responds: The device interface specifications, in accordance with PacketCable standards, must be managed by a single entity. In this case, INAP must assume device management role and must proxy each SN-port mapping. FIG. A6 flow steps MTA-5 to MTA-25 must be iteratively repeated for each SN that responds affirmatively to the offer request claiming device-port management. The configuration file created by INAP for the MTA and stored on the TFTP is assembled by merging the multiple file specifications crated by each provider independently. All unclaimed ports must defaulted to be assigned to use the INAP-CA as in case a) above.

FIG. 1 illustrates the architecture platform of INP-NAS: When the NAU object is discovered, a transaction is sent from the HDT EMS to the NAS Application Controller (001). The controller classifies NAU type and initiates the Registration MIB, then associates an appropriate temporary hot-line service (or dynamically provisions a service) in the LDS to establish the service path (000). The terminal is signaled, and when the phone is answered, the caller is transferred to a recording and transferred to the CRM Center (002) or to the Provisioning IVR (004), which record the ANI of the temporary hot-line. Order from SMS is transferred to Provisioning OSS (003) (or was earlier transferred). NAS Application Controller associates Registration MIB with Work Order in Provisioning OSS and supplies desired final data to Provisioning OSS to supply permanent service. When final service is provisioned, the temporary hot-lines are returned to the LDS pool.

FIG. 2 illustrates a form of Network Access Service, i.e. top-level process diagram for Immediate Network Access Service (INAS) illustrates use of the Object Discovery, registration to determine next services. Object discovery results in an autonomous event and may occur when a new NAU, a replacement or substitute NAU are installed, or as a result of an outage. The appropriate service depends on whether the discovery is for a previously known (registered) or new (unregistered) object. The Immediate Network Access Service is detailed in FIG. 2. The remaining services are straightforward to understand and entail verifying and reprovisioning the service component in question.

FIG. 3 illustrates a form of Immediate Network Access Service showing Temporary Access, Service Negotiation and Installation, i.e illustrates the access service type applied when an unregistered NAU is discovered. The reason for this event occurrence can be either new installation or repair. Depending on whether the discovered object is customer self-installation, or technician installation, different class access line services are provided automatically. In the event that the Object Discovery relates to data objects, these lines are replaced by non-routable network paths, which in effect, create a hot-line service. Object discovery creates a registration record that is held in a Registration MIB for later use by Provisioning until the appropriate action is determined and the data collected is used to associate the Registration MIB data with the Work Order or with an item being replaced.

For a customer performing a self-installation, a hot-line is assigned (or again dynamically provisioned) (127) to transfer a user to the Business Office. When the customer answers, the transfer occurs automatically perhaps after receiving a welcome message.

For an installer performing a NAU installation, a similar sequence is initiated. However, upon going "off-hook" (129) the hot-line transfers the installer to the provisioning IVR to automate the installation or repair activity. The installer enters the work order number and hangs up (122). The IVR then supplies the collected data to the NAS Application Controller, which instructs provisioning sequence to perform the required task (120). Upon completion of the task, the NAS Application Controller, via the IVR, calls the installer's phone to confirm completion (123), which also provides the benefit of completing an incoming call verification test. The installer, now reconnected to the IVRR signals that the LNP activation to be completed (if appropriate) and then hangs up. The IVR once again calls the installer, and confirms completion (136).

FIG. 4 pertains to Innate Switch Nomenclature and depicts static information representing network connectivity between the switch and HDT data that must be entered into the NAS application prior to its use. The nomenclature of switch that is entered is the Switch Identification, Switch Module (SM), Integrated Digital Control Unit (IDCU)/Digital Network Unit for Sonet (DNUS), and the HDT that is connected via normal telecommunications transport facilities. While the technology being used ins germane to a Lucent® switch, other switch types and respective information may be substituted. The invention is not limited to any particular switch available from any particular manufacturer. Each element mentioned above is also associated with its numeric switch translations. A "Donor" switch is also identified. The Donor is the identification of a switch that will provide the in-band communications channel to gather the IVR data. The donor switch is important, given complex network technology, up to five (5) switches might be connected to an HDT. The nomenclature of connecting two, or more switches, to the same HDT is identified as a type of multi-hosting.

FIG. 5 pertains to nomenclature of the Host Data Terminal (HDT) used to identify the permanent data that must be entered into the NAS application prior to use. This data, in part, represents the unique data elements that must be used in HDT commands to range/marshal an NAU and activate a port. The default port to activate is port 1. While the default port to activate is 1, changes to designation in the HDT reference data can alter this default.

FIG. 6 depicts a generic example of a Subscriber Order and is simply an example of a subscriber order (a.k.a., as Service Order). Its presence is only used so that the functionality of the NAS application can be described.

FIG. 7 illustrates an Object Discovery message arriving from HDT upon the event that an NAU is powered up on the CATV network and depicts the information that is provided by the HDT whenever a unit that was not previously provisioned on the HDT is powered up. The information contains the HDT ID, equipment type of the unit being powered up, the equipment's electronic serial number (ESN), and the ID of the modem that was used to pass the message detection through when it was being sent from the NAU to the HDT. This message represents notification from the HDT to an Element Manager.

FIG. 8 illustrates matching the Object Discovery Message to the Provisioned HDT information and is presented to show the correlation that occurs between the Object Discovery message (FIG. 6) and the static data that was maintained about the HDT (FIG. 4). Note that the HDT ID is used as the means by which to two groups of information are correlated. It is also important to note that the identification of an available CRV can be found via accessing provisioned information in the HDT. This CRV designation can either be found directly, assuming that the HDT manufacture supports this capability, or can quickly be found via a custom written subroutine that accesses data within the HDT. In any case, a reservation is placed against the CRV that is returned.

The static HDT information also maintains an upper and lower limit for CRV values to be assigned. In the event that a CRV range has been exhausted, an error message will be issued to provisioning personnel that is monitoring the health of the inventory application.

It is also important to note that there can be more that one modem card associated with a FiberNode. Given this situation, the innate and static information referenced in FIG. 4 includes a modem upper limit and the association with companion modem cards is maintained. In the event that an upper limit has been reached and a companion modem card with capacity can be found, then the modem card with the available capacity is used.

Given this information, the HDT now ranges/marshals the NAU and activates port 1.

FIG. 9 illustrates establishment of an in-band communication path to enter WR information. Since the discovered information discussed in FIG. 7 contains the HDT ID, it can be correlated to generic switch information that was discussed in FIG. 4. From the generic switch information the identification of the donor switch can be found. Additionally, each donor switch has two other information groupings associated with it. This first additional information grouping is a pool of Telephone Numbers (TNs) that are designated in advance for the establishment of the in-band communications channel to gather the IVR information. Please note that the status of each TN must be maintained in that it can either be in a state of being "in-service" or being available for assignment. The second information grouping associated with the donor switch is a generic reference to a "Line Class Code" (LCC) and RAX code to be used when setting the translations in the switch to instantiate in the in-band communications path. At this point, the LEN/OE is dynamically determined via the information identified in FIG. 4, the LCC and RAX are known, and the TN from the pool has been given. With these data elements it is possible to establish the in-band communications path.

A more detailed description may be helpful concerning the LEN/OE. After the LEN/OE is derived it is checked by issuing a verify to the switch directly to ensure that the LEN/OE is not already being used. If the LEN/OE is found to be in use then the line that is using the LEN/OE is disconnected. This action causes no service disruption since the CRV was not previously used to establish a cross-connect in the HDT. The in-band channel is then established.

FIG. 10 pertains to an installer providing IVR information and depicts the information that is transferred from the installer to the NAS application via an IVR mechanism. It is important to recognize that the telephone number associated with the in-band channel is automatically found via "Automatic Number Identification" (ANI). This functionality is also know as "Caller ID" and is resident as a generic switch supported function. The ANI will be cross-verified with the Telephone numbers kept in the pool described in FIG. 9. If the TN is in the pool and shows a status of "in-service" then the NAS application knows that this is a new connect order awaiting final provisioning.

Repair Activity: The remaining cases involve an installer clearing a "trouble ticket." The installer may replace a faulty unit, or select another port on the NAU to restore service. In these cases the installer would also inform the NAS application of his/her intent via the IVR functionality. The replacement NAU is Object Discovered and the service request creates a Registration MIB for use by the NAS application. The IVR is used by the installer to replace the "faulty NAU" with the newly discovered NAU by selecting "replace NAU" from the IVR menu selection and entering the serial number of the faulty NAU. The autodiscovered details of the new NAU are sufficient to reprovision the HDT.

FIG. 11 pertains to information used to establish in-band communications channel correlated to the original service order that was entered and depicts how an existing subscriber's order is associated with the Object Discovery message (see FIG. 6). These two groups of information are associated though the issuances of the WR message. In the case of a new connect order, the TN that was assigned to the in-band communications path is associated with the IVR message. Since the IVR message also supplies the order number entered by the installer, an association can be made. This technique allows all pertinent information concerning the facilities and network resources to be associated with the order.

As to assignment of Serving Switch, in the event that the donor switch is the final serving switch, a simple set of switch translation changes can be issued to facilitate the institution of the service. In the event that the donor switch is not the switch to be the permanent serving switch, then a disconnect order is entered to the switch that supported the in-band communications and a new connect is instituted on the correct serving switch.

In the event that the final serving switch is not the donor switch, then the function concerning identification of a CRV and LEN/OE are re-performed. This action is necessary to ensure that no conflicts exist between the serving switch and the HDT that could result in an errant condition.

Restated, FIG. A1 shows the high level Global Information Service Network (G-ISN) comprised of functional entities identified as Customer, Service Retailer (SR), Service Network (SN) and Access Network (AN). The following sections describe the interaction between the customer equipment (CPE or NAU) and the AN containing the INP-NAS server, the SR, and SN. The Installation Service for circuit telephony is for a vertically integrated provider, while the Installation Service for VoIP details three possible arrangements.

Provisioning Circuit Telephony Using NAS Installation Service

This INP-NAS invention is designed to become operational with a minimal set of data. The data elements that must be provided to initiate the functionality is a description of the switch nomenclature (naming conventions) and the relationship to the HDT. The HDT must also be described with a minimal set of information that will be used in the ranging/marshaling of an NAU and the activation of a port. In the absence of any other configuration information, port 1 of the NAU is activated to facilitate the telephony drop. Inherent in the switch description information and HDT, the numeric identifiers that make up the LEN/OE must also be provided.

The inherent functionality of the NAS application will be described in sub-sections.

These sub-sections include:
  Security
  Processing of a new connect order (LNP and non-LNP)
  Processing of a change order
  Processing of a disconnect order (LNP and non-LNP)
  Rearrangement or reconfiguration of the HFC or telephony network
  Repair functions
  Moves (permanent and temporary location moves of access)

Orders can be entered into the SMS as they arrive. Inherent in every order is a date by which the service is to be instituted (i.e., a new connect order), changed (i.e., a change order), or disconnected (i.e., a disconnect order). However, it is possible for a subscriber to either cancel an existing order, or change the previous order with respect to line features and due date. Changes that take place on existing orders are referred to as "Supplemental Orders." The method by which the NAS application identifies the correct order to be worked is by reviewing the "auto-sequence" number that will always be present in the relational table that holds the pending orders. The "auto-sequence" number is a primary key field in the table. The underlying basis of the NAS application's data store described herein is a relationship database. Supplemental orders and the identification of the correct order to be processed are found by reviewing the auto-sequence number. Simply, all orders that have the same subscriber order numbers are extracted from the table. The entry with the highest "auto-sequence" number is the correct order to be processed.

The INP-NAS implements an Object State Model identifying states for access equipment. Normal states include "new", pending service", "service active", "service disconnect." State transitions and services depend on the Autonomous Object Discovery event. Normal permanent service is provided to a subscriber from the "service active" state. Temporary or session-only services are supported from the "pending service" state. Services described herein are shown as being triggered from specific states.

With respect to new connect orders, the Object Discovery is triggered by powering of the NAU or connecting the NAU to the CATV network. The HDT, after ranging or marshaling the NAU, issues an autonomous Object Discovery message to the HDT Element Manager. The element manager will "package" the data from the HDT and append an "Element Manager System Identifier" (EMSID) before issuing an autonomous message to the NAS application described herein. The message from the Element Manager will contain an EMSID, HDTID, Equipment Identifier of the NAU that was powered up, the ESN (electronic serial number) of the NAU, and the modem identification that resides within the HDT that received the message from the NAU that it had been powered up on the CATV network.

Upon receipt of the message from the Element Manager that an NAU has been discovered, the NAU will be immediately directed to range/marshall the NAU and activate the port that will provide the in-band communications path. The LEN/OE will the be calculated and verified by accessing the donor switch, or the shadow database of the donor switch's shadow database (i.e., the mirror image of the switch's "Office Defined Database"). After ensuring that no conflicts exist, the NAU will be ranged and the port activated.

Object States and Transitions

When the installer calls into the IVR, the originating TN is captured by the IVR using "Automatic Number Identification" (ANI). ANI is commonly referred to as "Caller ID." The installer needs only to enter the subscriber's order number and hang up. In the event that the order is for multi-line services, the installer many enter information into the IVR that associates a Master TN for each line with a designated port. The Master TN is the primary number to be assigned to a line. Distinctive Rings TN's can also be placed on the line to offer a different ringing cycle to help identify the intended recipient of a call. The assignment of Master TNs to specific ports is at the discretion of the installer. A packet of information from the IVR software to the NAS application is issued and contains the Originating Telephone Number, Subscriber's Order Number, and—if applicable—the Master TN to NAU port associations.

The ANI is compared with hot-line TNs that have been set aside. If it is found that the originating TN is a member of the pool and that the status of the TN is "in-service," then the data collected is associated with the Registration MIB. In the event that the ANI is not found to be a member of the pool, then the installer will be prompted by the IVR for a Master TN to port assignment and the ESN of the NAU to be used. In this case, the ESN will be used to either find the MIB Registration complete the service, or reference other NAUs that have already been placed into service. In either case, the associated subscriber order will be used to send appropriate translations to the switch to institute a subscriber's service in accordance to the order that was submitted.

The IVR may also be capable of accepting an independent message from the installer to facilitate the clearing of a trouble ticket. In this case, the installer can direct service on one NAU port to another port on the same or another NAU, or support direct replacement of the NAU. In either case, the NAS application will automatically restore service in the re-arranged line in accordance to the service records for the line.

In the event that a change order is submitted, an execution of the order is performed on the Due Date and is limited to switch translations that will modify the existing features of an existing line. The line to be changed is found by matching the existing Master TN to that specified on the subscriber's order.

Disconnect orders are dealt with in various ways. First, a hard-disconnect is defined to be a removal of service that also returns facilities, inventoriable items, and equipment for use by a subsequent new connect order. Second, a soft-disconnect is defined to mean a removal of service by changing a switch LCC and setting a switch feature of SUST=Y. This implies that all facilities, inventoriable items, and equipment are maintained to preserve the circuit that exits to the subscriber's location. Third, disconnects can also be performed in a fashion that the subscriber decides to maintain their TN via another provider. This is termed as an LNP "port out". In the case, a non-conditional trigger is set in the existing switch and is subsequently removed after so many days that are user determined. Typically, the removal of the trigger happens in 10 days. Lastly, a disconnect can be performed with an associated intercept message.

Provisioning IP Telephony Using NAS Installation Service

For the IP Telephony scenario, this invention provides an IP variation to the Immediate Network Access Services suitable for VoIP. It requires a modification to the process described above. The process flows described apply, however, the signaling and control specifics differ for IP Services. The INP-NAS acts as active agent and intermediary (proxy) between the end devices (CM and MTA) and the network servers. The services utilize control logic that based on MIB data and enterprise policies of the operator. INP-NAS can be implemented as a stand alone server or utilize a proxy server and policy server to effect the desired services.

For illustrative purposes customer self-installation will be described because this is the most logical application for a newly discovered MTA.

For cable services, the connecting adapter is called a Cable Modem (CM) for data service, and the adapter which converts service to telephony is called a Media Terminal Adapter (MTA) for VoIP service. The physical combination of these is known as the Enhanced-MTA (E-MTA). These devices are provisioned in two stages, first the CM, and subsequently the MTA. The CM can optionally indicate that MTA registration will follow.

FIG. A2 illustrates the three scenarios that depict the full interoperation between Access Provider and Service Provider networks. Service accounts are assumed to exist only with the customer's primary P-SR. Enterprise policies must be established in the TPA for the following scenarios to correctly work. For example, only the P-SR may authorize the customer for service: non primary SRs may not authorize or offer service except via Brokerage Service.

Upon Installation of the CM, device registration occurs within the AN. INAP Registration Service (INAP-RS) receives the standard "DHCP Broadcast Discover" message sent by the CM. INAP-RS first attempts to identify the P-SR by first checking the AN Registry MIB for authorization, and if not found, then INAP-RS multicasts request to TP SRs for authorization.

Cases:
1. A single business entity provides P-SR, AN and SN functions are provided locally: After DHCP, Broadcast Discover is received, INAP-RS confirms that CM. Upon receipt, CM next requests an IP address. The AN DHCP server assigns the permanent IP address. This is the normal case when a customer access has a local account with the provider and a power restart occurs or if the unit is moved within the realm of the AN.
2. Access Provider locates primary SR: INAP-RS fails to identify CM device as locally registered, next multicasts Offer request to all TP SRs and receives one response authorizing access. INAP-RS next authorizes AN DHCP to return offer to CM. CM next sends AN DHCP server request for address which then assigns a local IP address. During registration exchange, the INAP-RS assembles SR provisioning data and registers the locally assigned DHCP address with the SR. Network address translation (NAT) may be necessary depending on the IP version supported. In order to properly account for services rendered, the AN gateway and RKS must be set up to measure usage for final access usage for billing back to the P-SR. Device provisioning is completed using established configuration files from both the primary SN and local AN TFTP servers.
3. No SR authorizes access and AN initiates Brokerage Service. Customer hears welcome message and is offered broker service or emergency service.
   Cases:
   a) Customer abandons access after being connected to broker service. Instant Access Service is terminated.
   b) Customer has no SR and uses broker service, then selects Primary SR. Outcome results in INAP-RS setting up hot-line to selected SR business office.
   c) Customer, having an existing account, desires registration of new equipment uses broker service to reach the business office or a registration server where customer can authenticate themselves and associate new equipment. Equipment reconfiguration may be necessary because a new AN network (e.g. DSL rather than Cable) may be used. Account verification is required to prevent theft of services under an assumed identity. SR policy will determine if two identical NAUs will be permitted to be registered to the same account.

VoIP Service

MTA is Recognized to be a Telephony Device Network Adapter

Cases:
1. A single "vertically integrated entity" provides functions of SR, AN and SN: After discover is received, INAP-RS confirms with SR server that CM device has active account, INAP-RS authorizes the TSP DHCP Offer response to the MTA which next requests an IP address. The TSP DHCP server assigns the permanent IP address.
2. Access Network INAP-RS locates primary SN via multicast: Primary SN DHCP recognizes requesting device and returns "DHCP Offer" to authorizes network access. INAP-RS returns response to MTA which next sends a DHCP Req message. INAP-RS must request local IP permanent address assignment that provides access per terms of the TPA. INAP-RS requests registration from Primary SN and returns a new DHCP ACK response by combining information from Primary SN which also supplies the FQDNs of device and CA, etc.) with local addresses. INAP-RS registers the local address with the host DNS.

The phone numbers used for the SR hot line must be identified by the SR based on the TPA. This, allows a customer to select any SR and be routed to their business office. Within the Primary SP, the hot-line TN association with device and port are stored in the Registration MIB. (At this point the specific customer service association is not yet identified.).

Under terms of the TPA, the gateway and RKS must be provisioned to measure usage for foreign access billing to Primary SP. Device provisioning must be completed using standard configuration files and process established from the Primary SP.

3. New Access Request resulting in brokered service: If no "DHCP Offer" is received within response window then AN may assign a temporary IP license restricting access to broker service and subscription services. If neither, then the local method with temporary license and binding to CA which provides for WR handling is used for 611, 911, and broker services.

The customer picks up phone, and hears a welcome message and is transferred to the SR Business Office to order service. Service is negotiated and the SMS sends the Work Order containing the a unique key code such as the ANI of the hot-line concatenated with a date-time stamp or a key used from the NAS-RS. Key code is later supplied by provisioning OSS to retrieve the related MIB from INAS inventory. If key code includes that the clocks are not precisely synchronized. The customer service representative is provided with data that indicates for the type of equipment discovered the type of services that can be ordered. Upon completion, customer hangs up phone.

The order flows to provisioning OSS within the Primary SP. The key code is the retrieval key permitting correlation to the Registration MIB.

The OSS interacts with NMAS and provisions CMTS (Call Management Terminating System) and assigns routable IP address and downloads correct customer specific configuration file to the MTA.

The MTA phone that was provisioned is signaled and the customer is played an IVR message confirming that service is active and prompts for customer acknowledgment of service quality. If customer indicates satisfactory service, then the LNP transfer occurs to complete the telephony service. If customer indicates unsatisfactory service, then the customer is transferred to repair.

The invention may be embodied in other specific forms without departing form the spirit or essential characteristics thereof. The present-embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed and desired to be secured by Letters Patent is:

1. An information services architecture network comprised of a plurality of functional entities establishing a virtual services network comprising:

a service retailer entity performing customer service account management and establishing service and network contracts pertaining to service rendering and entity interoperability, the service retailer entity maintaining brand identity, determining service bundling, and establishing terms and conditions for purchase, billing, and customer servicing;

a service network entity providing customer information services including data, information, telephony, video, or applications services;

an access network entity providing access services to customers pertaining to registration, service binding, and procedures to obtain services, the access network entity providing integrated access and transport to a service network, the access network entity further providing fully automatic and transparent access service and performing multi-level and multi-network registration between an access network of the access network entity and the service network enabling seamless interoperation and registration to establish a binding between a customer and the service network which automatically occurs at data, transport, network and service layers, relations by the access network entity providing plug and play service without first needing to create an account with either an access or service provider and without first needing to request to pre-register or pre-provision the customer, equipment, or other account details.

2. An information services architecture network according to claim 1 by which a telephone customer achieves telephone number portability wherein the service retailer entity further decouples physical location of the customer from the access network by authorizing an alternate access network to bind the customer to the service network and maintaining a customer telephone number provided by the service network on the alternate access network.

3. An information services architecture network according to claim 1 wherein the service retailer entity further provides security services that expose unauthorized activities on the access network by characterizing access by an intervener network address of the intervener delivering the intervener to a service point, and when a discovered object is in an unrecognized state or not in a service-active state, verifying that the discovered object is not simultaneously active elsewhere.

4. An information services architecture network according to claim 1, wherein the access network entity further provides an intelligent network subscription service that generates and automatically downloads a configuration file customizing each device access port to provide normal service access for registered ports and to enable pre-service access for non-registered ports.

5. An information services architecture network according to claim 4, wherein the configuration file is selected from the group consisting of a dial up script, a traditional initialization file, and a browser cookie enabling subsequent recognition by the network access entity.

6. An information services architecture network according to claim 4, wherein the configuration file is generated by merging or recompiling registration data for device ports simultaneously associated with multiple service network entities.

7. An information services architecture network according to claim 4, wherein the access network entity further provides a pre-service arrangement by offering local service establishment with a brokerage service, allowing a customer to select a desired service retailer entity from a plurality of service retailer entities, each service retailer entity identifying service bundles, and offering "terms and pricing" and other incentives available to the customer in making A final service retailer entity selection.

8. An information services architecture network according to claims 1 or 7, wherein the access network entity further provides immediate network service comprising:
    emergency service with automatic determination of a jurisdictional public service answering point for customer's physical location of a customer which is determined by the access network entity and stored in an access network registry upon object discovery and registration,
    internetwork binding transferring a public service answering point address to service networks for storage and optionally provisioning a local digital switch to ensure accurate service to the jurisdictional public service answering point,
    mobile customers entail registration chaining, and
    requiring public service answering point addresses to be dynamically updated.

9. An information services architecture network according to claim 1, wherein the service retailer entity further provides a network access mobility service by automatically registering a moved device within a service area to re-provision the moved device at a new access point.

10. An information services architecture network according to claim 1, wherein the service retailer entity further provides network revenue assurance services that include compensatory network access services accommodating detection of registration changes in the service and generating a verification of transaction whenever a registration change is detected to ensure integrity of usage accounting detail.

11. An information services architecture network according to claim 1, wherein the service retailer entity establishes policy based on originating call intercepts, notifies the customer of delinquency, fraud and other account issues, permits the customer to resolve account issues with a simple one-touch transfer, and returns the customer to normal active service.

12. An information services architecture network according to claims 1 or 9, wherein the service retailer entity further provides mobile session bridging services for wireless network access by providing a session agent that maintains a call in-progress, monitors for signal disconnect, and reestablishes the call in-progress automatically when a new object registration event is detected.

13. An information services architecture network according to claim 12, wherein the service retailer entity further bridges service across at least two access networks when a customer migrates from one access network to another and uses session data for accounting and billing.

14. An information services architecture network according to claim 1, wherein the service retailer entity further identifies access network and service network functions operating in accord with trading partner agreements, the access network entity further supplies access services and provides binding and transparent connectivity to the service network, and the service network entity further provides service for both local and remote access.

15. An information services architecture network according to claim 1, wherein the service retailer entity further authorizes service interworking between the service network and an access network.

16. An information services architecture network according to claim 1, wherein the access network entity further performs object registration in access and service networks, couples access network and service network registration services, and furnishes registration management information to the service retailer entity and the service network entity.

17. An information services architecture network according to claim 1, wherein the service network entity includes an accounting collection module for a service network and a billing processor that issues accounting back to the service retailer entity.

18. An information services architecture network according to claim 1, wherein the service retailer entity further receives accounting collected by an authorized access network entity.

19. An information services architecture network according to claim 1, wherein the access network entity and the service network entity return accounting to the service retailer entity and the service network entity provides payments to the access network entity and the service retailer entity for service rendered to a specific authorized object.

20. An information services architecture network according to claim 1, wherein the service retailer entity further authenticates an identity of an internet service network and authorizes customer access via any type of access network.

21. An information services architecture network according to claim 20 wherein, after accepting authorization, the service network entity establishes a persistent association, via provisioning, between an object and the service network.

22. An information services architecture network according to claim 21, wherein the service retailer entity further records in a registration management information base current and past associations of authorization between the object and the service network.

23. An information services architecture network according to claim 22, wherein the service retailer entity further supports registrations having various time durations of service including long term, monthly, specified interval, or event based time durations of service.

24. An information services architecture network according to claim 21, wherein the service retailer entity further alters a binding between the object and the service network when, if a new access network association is authorized, the service retailer entity sends a releasing notification to a previously authorized access network to terminate binding and usage billing therein.

25. An information services architecture network according to claim 21, wherein the service retailer entity further initiates service orders for work to be performed by existing service systems.

26. An information services architecture network according to claim 1, wherein the service retailer entity further provides access services comprising managing access services including interconnection binding, access denial of service, conducting surveillance intercepting treatments, and billing and usage exchanges.

27. An information services architecture network according to claims 6 or 26, wherein the access network entity simultaneously manages independent service bindings between objects and service networks, the bindings connecting device-port objects wherein a first line is registered as a virtual private network including a remote business line, a second line provides a primary line service from a home; and a third line coinects to a low cost secondary line service at a lesser rate.

28. An information services architecture network according to claim 27, wherein the access network entity further establishes policy based registration services that require telephone service retailers to respond to offers and exchanges in a maimer consistent with interconnection agreements.

29. An information services architecture network according to claim 27, wherein the access network entity further identifies service retailer entities via reference to a registration management information base and multicasts a request to add newly identified service retailer entities if the service retailer entities are not explicitly identified in the registration management information base.

30. An information services architecture network according to claim 27, wherein the service retailer entity further determines access telephone provider status for acceptance of remote registration requests.

31. An information services architecture network according to claim 30, wherein the service retailer entity further performs security checks to determine access status for service access, denial, and intercept purposes.

32. An information services architecture network according to claim 30, wherein the service retailer entity further provides access authorization to a registering object whose associated account is in good standing, or provides appropriate service treatment including denial of service and intercept.

33. An information services architecture network according to claim 1, wherein the service retailer entity further provides a plurality of cascaded registrations at service layers including physical access, device, object, data, network, transport, session, presentation, and application layers within and across interconnected access and service networks, wherein the cascaded registrations include specific and related information pertaining to a service.

34. An information services architecture network according to claim 1, wherein the service retailer entity further authorizes internet access services by providing an access authorization mechanism that utilizes Offer/Accept exchange to authorize interconnect binding or designate access treatment including denial and intercept.

* * * * *